United States Patent
Bergeron et al.

(10) Patent No.: US 8,093,842 B2
(45) Date of Patent: Jan. 10, 2012

(54) POSITION CONTROLLED DRIVE MECHANISM

(75) Inventors: Bruno Bergeron, Shannon (CA); Eric Bergeron, Québec (CA); Vincent Noel, St-Apolinaire (CA)

(73) Assignee: Exact Products, Inc., Québec (CA)

( * ) Notice: Subject to any disclaimer, the term of this patent is extended or adjusted under 35 U.S.C. 154(b) by 689 days.

(21) Appl. No.: 12/097,899

(22) PCT Filed: Dec. 21, 2006

(86) PCT No.: PCT/CA2006/002107
§ 371 (c)(1),
(2), (4) Date: Sep. 22, 2008

(87) PCT Pub. No.: WO2007/071057
PCT Pub. Date: Jun. 28, 2007

(65) Prior Publication Data
US 2009/0045767 A1    Feb. 19, 2009

Related U.S. Application Data

(60) Provisional application No. 60/752,022, filed on Dec. 21, 2005.

(51) Int. Cl.
*H02P 1/00* (2006.01)
(52) U.S. Cl. .................................. 318/135; 318/687
(58) Field of Classification Search .................. 318/560, 318/602, 135, 687
See application file for complete search history.

(56) References Cited

U.S. PATENT DOCUMENTS

| | | | | |
|---|---|---|---|---|
| 3,949,582 A * | 4/1976 | Eaton et al. | ..................... | 72/17.2 |
| 4,796,035 A * | 1/1989 | Kawasaki et al. | ............. | 347/262 |
| 5,251,142 A | 10/1993 | Cramer | | |
| 5,431,645 A * | 7/1995 | Smith et al. | ........................ | 606/1 |
| 5,952,804 A | 9/1999 | Hamamura et al. | | |
| 5,975,514 A * | 11/1999 | Emigh et al. | ................ | 270/58.06 |
| 6,025,685 A * | 2/2000 | Parsadayan | .................... | 318/471 |
| 6,216,574 B1 * | 4/2001 | Hain | ................................ | 83/241 |
| 6,271,641 B1 | 8/2001 | Yasohara et al. | | |
| 6,698,159 B2 * | 3/2004 | Harris et al. | .................... | 83/247 |
| 6,889,115 B2 | 5/2005 | Shiba et al. | | |
| 6,936,984 B2 | 8/2005 | Wilson | | |
| 7,036,411 B1 | 5/2006 | Harris et al. | | |

FOREIGN PATENT DOCUMENTS

CA          2057791         6/1992

* cited by examiner

*Primary Examiner* — Rina Duda
(74) *Attorney, Agent, or Firm* — Fay Kaplun & Marcin, LLP

(57) ABSTRACT

A position controlled drive mechanism and a control method for positioning a drive mechanism are introduced. A sensor generates a displacement signal indicative of a displacement of a movable stop driven by an electric motor. A controller controls rotation of the electric motor. The controller also calculates a position of the movable stop based on the displacement signal. The controller includes at least two modes of operation in which the controller controls the electric motor to rotate its shaft to reach a selected position of the movable stop; controls a voltage or current supplied to the electric motor to maintain a current position of the movable stop; controls the electric motor to rotate the rotatable shaft in a selected direction until an external object hinders the rotation of the rotatable shaft; and controls the electric motor to assist an externally initiated rotation movement detected by the sensor.

22 Claims, 24 Drawing Sheets

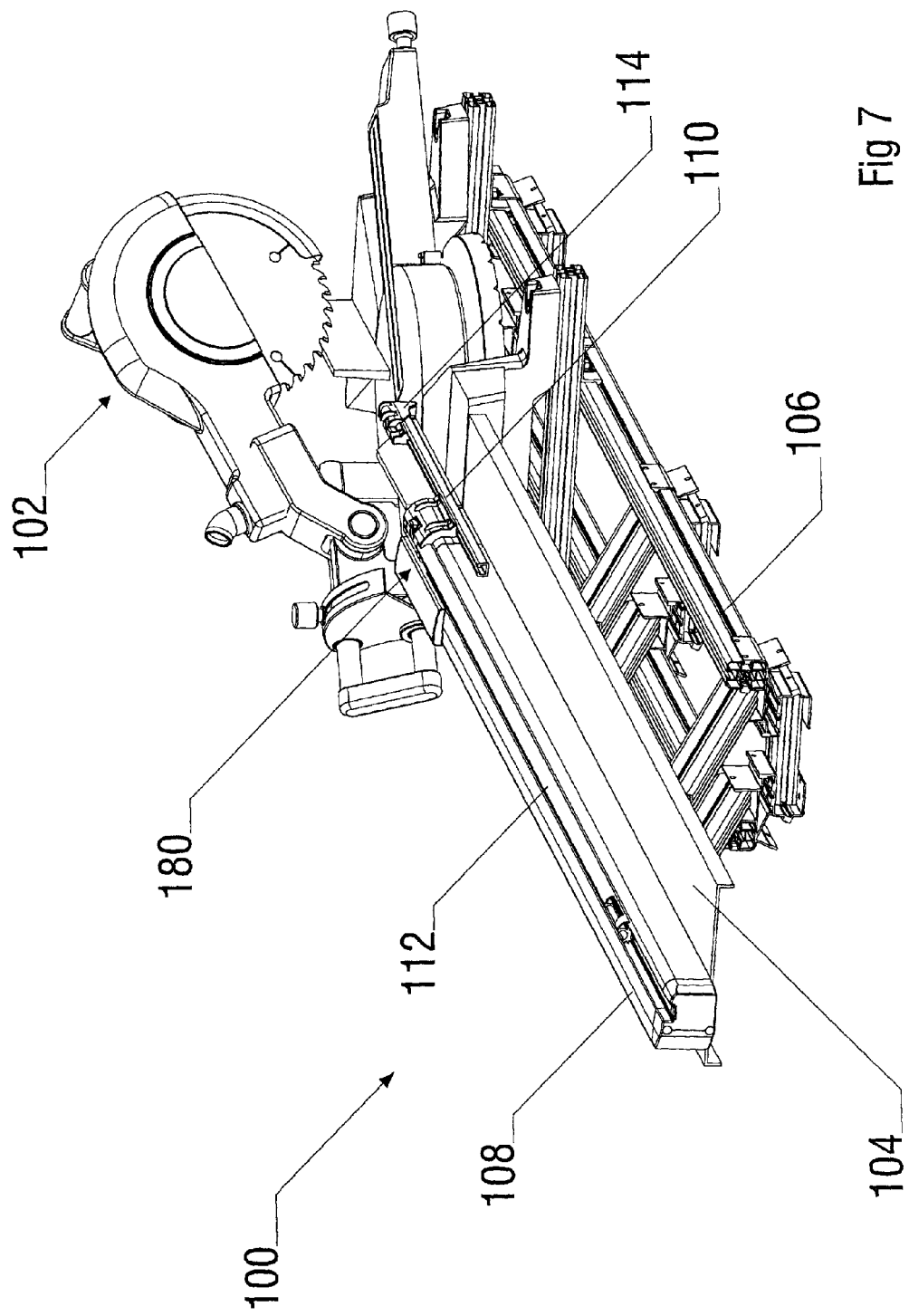

POSITION CONTROLLED DRIVE MECHANISM

FIELD

The present invention generally relates to drive mechanisms. More specifically, the present invention is concerned with a position controlled drive mechanism and method therefor.

BACKGROUND

Drive mechanisms are known in the art. They generally include a motor, a controller connected to the motor to control its operation and various sensors including limit switches, proximity sensors and the like, connected to the controller to supply data thereto in view of improving the usability and the safety of the drive mechanism.

The use of such sensors is detrimental since they are prone to failure and increase the cost of the drive mechanism. Furthermore, failure of safety sensors may lead, in some case, to material damage and potentially to human injury.

BRIEF DESCRIPTION OF THE DRAWINGS

In the appended drawings:

FIG. 7 is a perspective view of a miter saw provided with a motorized stop having a position controlled drive mechanism according to an example of application of the illustrative embodiment of FIG. 1; the motorized stop being shown in the position closest to the saw while in the first configuration;

DETAILED DESCRIPTION

Figure 1:
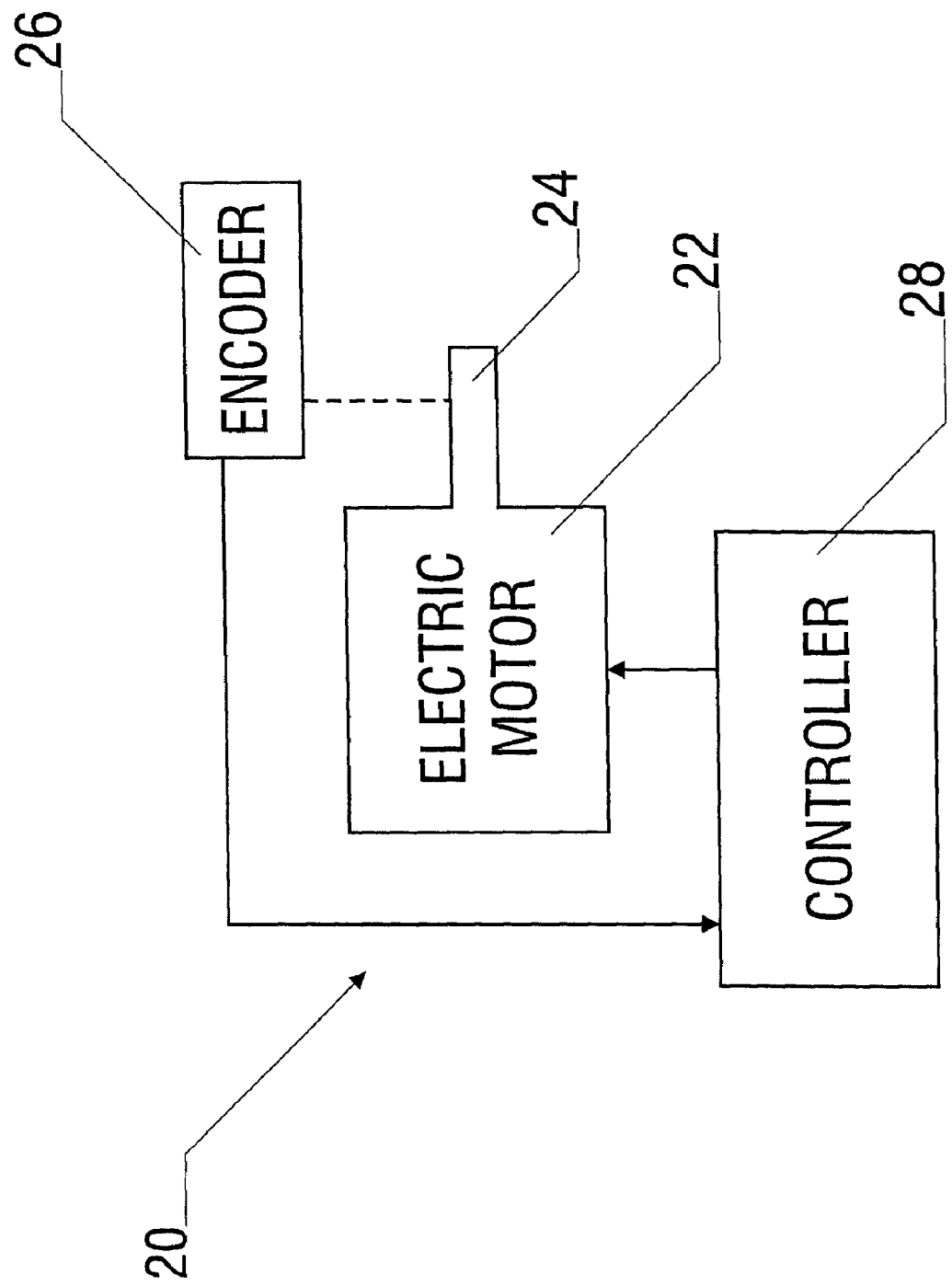
FIG. 1 is a block diagram of a position controlled drive mechanism according to an illustrative embodiment of the present invention.

In accordance with an illustrative embodiment of the present invention, there is provided a position controlled drive mechanism comprising:

an electric motor provided with a rotatable shaft;
a movable stop operably connected to the rotatable shaft;
a sensor for generating a displacement signal indicative of a displacement of the movable stop; and
a controller so connected to the electric motor that rotation of the rotatable shaft is controlled thereby; the controller being so connected to the sensor to receive the displacement signal and to calculate therefrom a position of the movable stop; the controller including at least two of the following modes of operation in which the controller is so configured as to: a) control the electric motor to rotate the rotatable shaft to reach a selected position of the movable stop; b) control supply of voltage or of current to the electric motor to maintain a current position of the movable stop, wherein the supply of voltage or current is cut if a large force applied to rotate the shaft prevents maintaining the current position; c) control the electric motor to rotate the rotatable shaft in a selected direction until an external object hinders the rotation of the rotatable shaft; and d) control the electric motor so as to assist an externally initiated rotation movement of the rotatable shaft detected by the sensor.

According to another aspect, there is provided a control method for the position of a drive mechanism comprising, in no particular order:

providing an electric motor provided with a rotatable shaft;
providing a sensor for generating a displacement signal indicative of a displacement of a movable stop operably connected to the rotatable shaft;
providing a controller so connected to the electric motor as to control the rotation of the rotatable shaft therewith;
transferring the displacement signal to the controller; and
configuring the controller to calculate a position of the movable stop based on the displacement signal an to alternatively perform at least two of the following modes of operation:

a) controlling the electric motor to rotate the rotatable shaft to reach a selected position of the movable stop;
b) controlling supply of voltage or of current to the electric motor to maintain a current position of the movable stop; wherein the supply of voltage or current is cut if a large force applied to rotate the shaft prevents maintaining the current position;
c) controlling the electric motor to rotate the rotatable shaft in a selected direction until an external object hinders the rotation of the rotatable shaft; and d) controlling the electric motor so as to assist an externally initiated rotation movement of the rotatable shaft detected by the sensor.

It is to be noted that in the present description and in the appended claims, the expression "dc motor" is to be construed as including dc servo motors, dc motors, dc brushless motors any type of motor that may be adequately controlled by a controller.

Other objects, advantages and features of the present invention will become more apparent upon reading of the following non-restrictive description of illustrative embodiments thereof, given by way of example only with reference to the accompanying drawings.

Turning now to FIG. 1 of the appended drawings, a position controlled drive mechanism 20 according to an illustrative embodiment of the present invention will be described.

The drive mechanism 20 includes an electric motor 22 provided with a rotatable shaft 24, and a movable stop (shown on later figures). In the particular embodiment of FIG. 1, the sensor generating the displacement signal indicative of the displacement of the movable stop is realized as an encoder 26 so associated with the shaft 24 as to generate shaft angular position data. A controller 28 is so connected to the electric motor 22 as to control the rotation of the shaft 24. The controller 28 is also connected to the encoder 26 to receive shaft angular position data therefrom. The controller 28 in turn calculates a current position of the movable stop by monitoring the shaft angular position data.

The electric motor 22 may be a stepper motor or a dc motor.

Many technologies can be used for the encoder 26 such as, for example, "Hall" effect sensors, magnetic encoders, optical encoders and mechanical encoders. The controller 28 continuously receives information from the encoder 26 used.

When a dc motor is used, the controller 28 is also configured as to continuously monitor the electric current supplied to the electric motor 22 to rotate the shaft 24.

Furthermore, the controller 28 is provided with an input device such as a keypad (not shown) to allow the user to input data in the controller 28.

As will easily be understood by one skilled in the art, the technology used by the controller 28 is partially dependent on the type of motor and the type of encoder used.

The controller 28 is so configured as to have four modes of operation selected by the user: direct positioning; position holding; object detection and movement assistance. While in any of these modes of operation, the controller 28 is also configured to detect potential incidents as will be described hereinbelow.

Direct Positioning Mode

In the direct positioning mode, the controller 28 receives a selected position from the user via the keypad (not shown). The controller 28 controls the motor 22 so as to rotate the shaft 24 in the direction required to reach the selected position. The angular position of the shaft 24 is continuously monitored by the encoder 26 and supplied to the controller 28 as a feedback that controls the motor 22 to slow down the rotation of the shaft 24 when the selected position gets near and to stop the rotation of the shaft 24 when the selected position is reached.

Of course, one skilled in the art will understand that the selected position could be inputted by other means. For example, it could be supplied by another input device such as a joystick or could be supplied by an electronic device such as a PDA (personal digital assistant) or a computer via a wired or wireless connection.

Figure 2A:
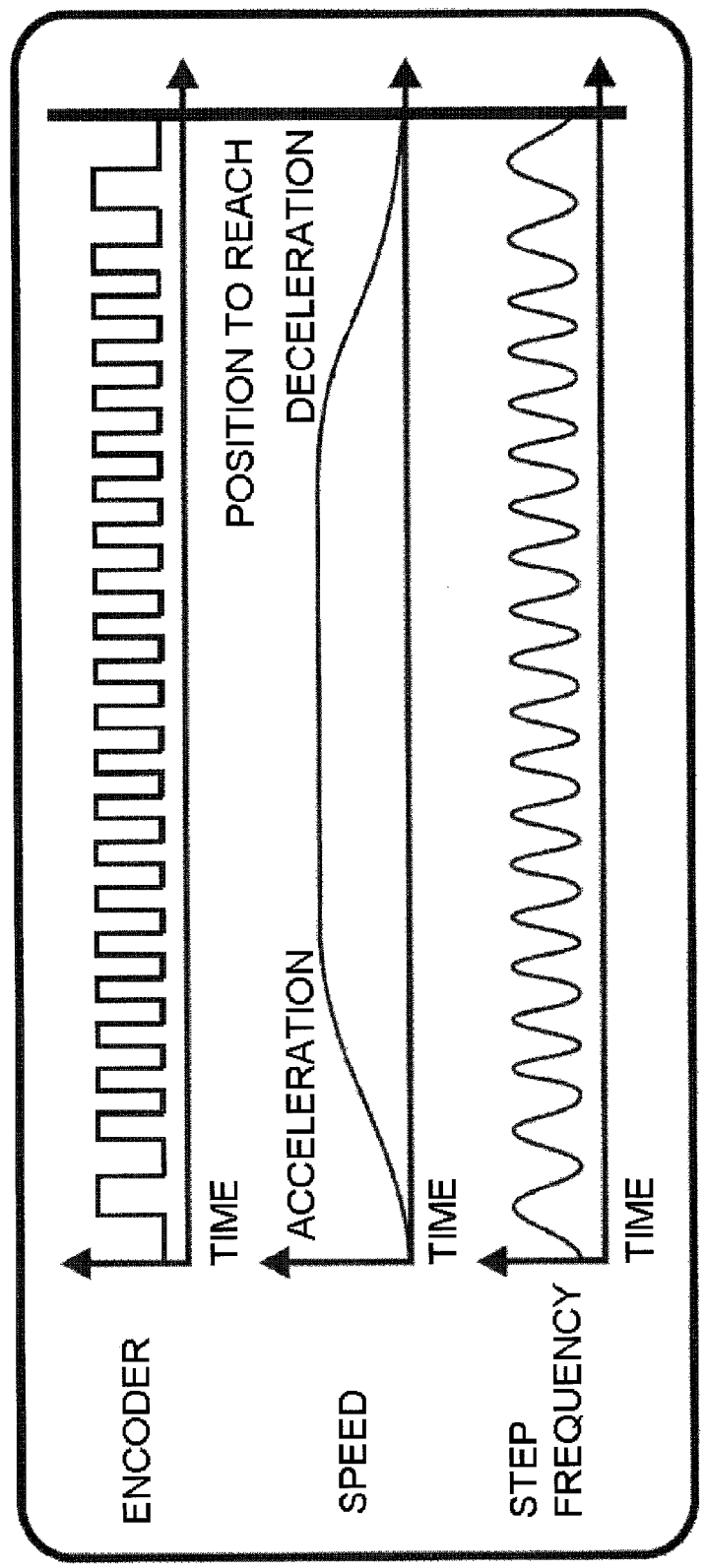
FIGS. 2A and 2B are graphs illustrating the direct positioning mode for a stepper motor and a dc motor, respectively.

FIG. 2A illustrates the encoder signal, the speed representation and the step frequency signal when a stepper motor is used as the electric motor 22. The encoder signal is the signal received from the encoder 26 and the step frequency signal is the signal supplied to the stepper motor by the controller 28. The speed representation is for illustrative purpose only.

It will be noted that the controller 28 controls the stepper motor, via the step frequency signal, so that the rotational speed of the shaft 24 accelerates from a standstill position to the predetermined nominal speed of the motor and that the speed decelerates when the position to reach becomes close.

To achieve the acceleration and deceleration discussed hereinabove, the step frequency signal supplied to the stepper motor is controlled by the controller 28.

Figure 2B:
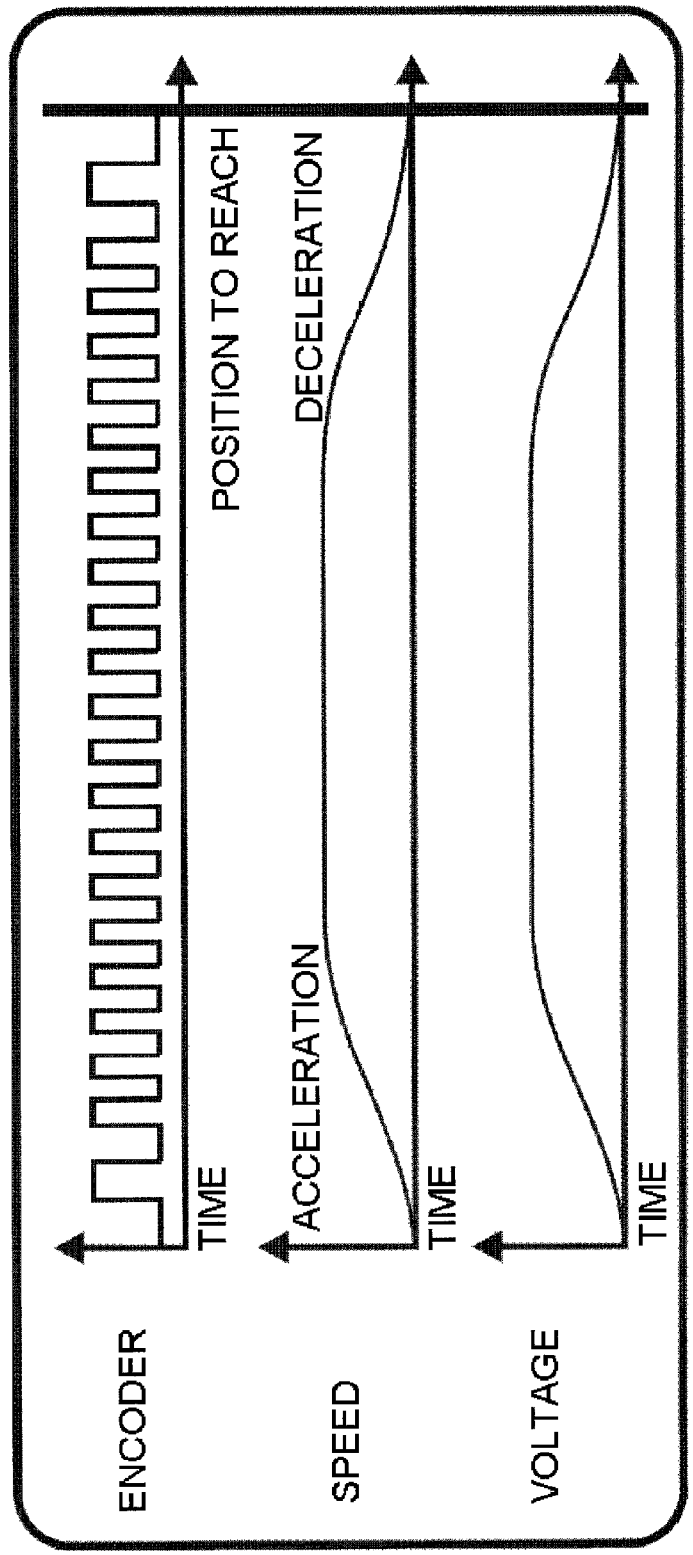

FIG. 2B illustrates the encoder signal, the speed representation and the voltage signal when a dc motor is used as the electric motor 22. The encoder signal is the signal received from the encoder 26 and the voltage signal is the control signal supplied to the dc motor by the controller 28. The speed representation is for illustrative purpose only.

To achieve the acceleration and deceleration discussed hereinabove, the voltage supplied to the dc motor is controlled by the controller 28.

As discussed hereinabove, while the controller 28 controls the rotation of the shaft 24 to reach the selected position, the controller also performs some safety functions.

When a stepper motor is used as the electric motor 22, the controller 28 monitors the signal coming from the encoder 26 to ensure that the shaft performs the predetermined pattern determined by the controller 28. More specifically, the encoder signal is monitored to ensure that the shaft accelerates, move at the predetermined speed, decelerates and stops to the selected position.

Figure 3A:
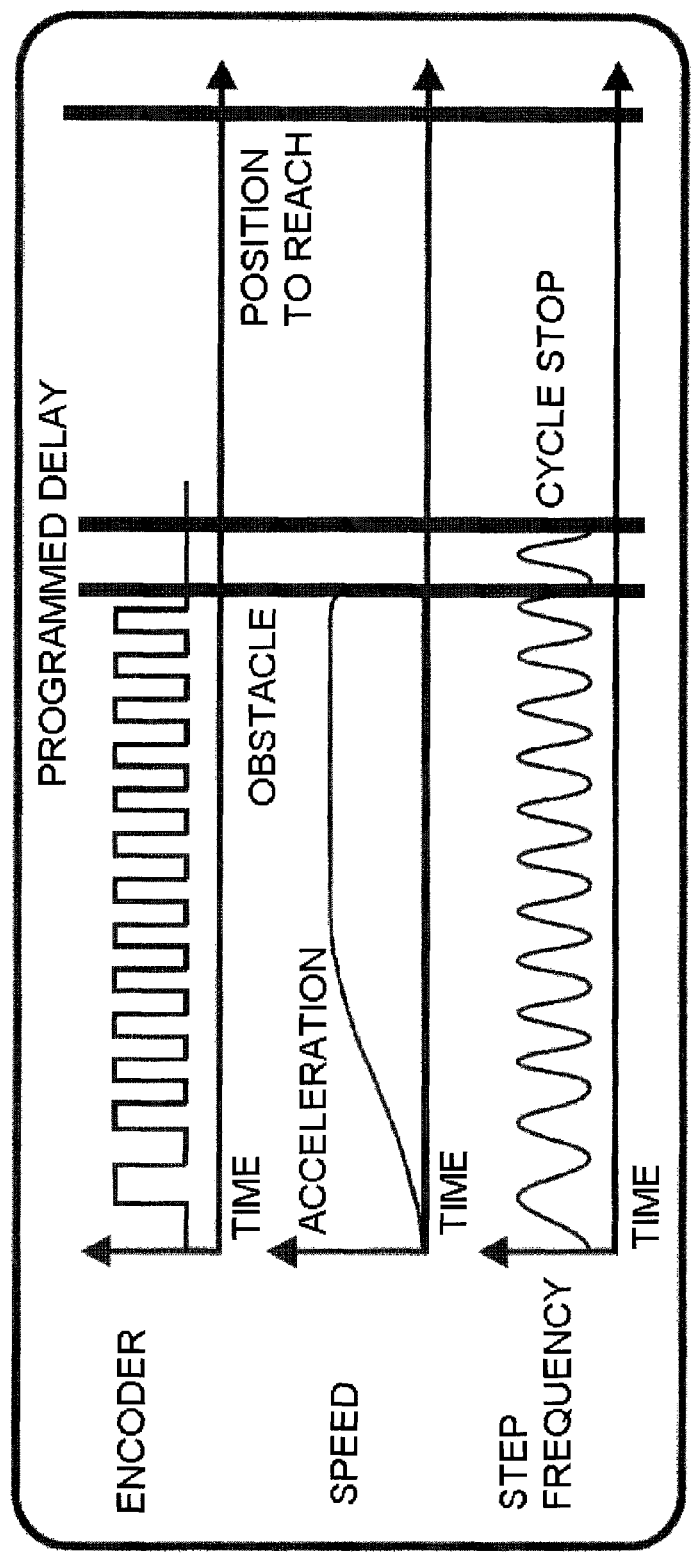
FIGS. 3A and 3B are graphs illustrating the safety mode for a stepper motor and a dc motor, respectively.

FIG. 3A illustrates the encoder signal, the speed representation and the step frequency signal when an object is encountered before the position to reach is reached and a stepper motor is used. This is an example of the safety function in operation. When this is the case, the encoder 26 will indicate no movement for a predetermined programmed delay. The controller 28 then stops the cycle of the stepper motor to limit or prevent damages to the system and potentially avoid injury.

When a dc motor is used as the electric motor 22, the controller 28 also monitors the amount of current supplied to the motor 22 during the rotation of the shaft 24 to reach the selected position. Should the amount of current increase above a predetermined safety level, the controller 28 cuts off the voltage supplied to the dc motor. Indeed, the increase in the amount of current supplied could be caused, for example, by an object preventing rotation of the shaft 24, by an external shock to the movable stop or by dirt accumulation in the mechanism. It is to be noted that the predetermined safety level of current supply may be dynamically determined, for example depending on the past levels of current supplied.

Figure 3B:
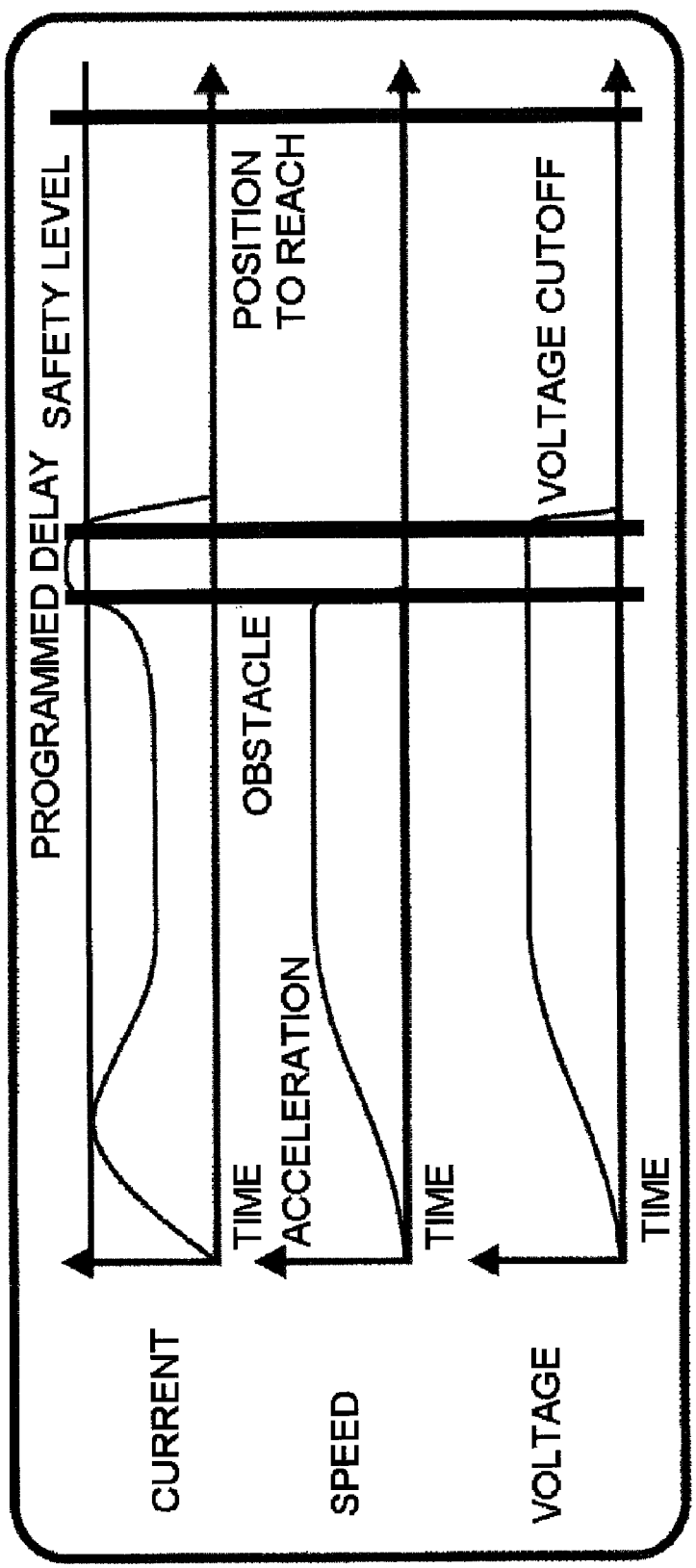

FIG. 3B illustrates the current signal, the speed representation and the voltage signal when an object is encountered before the position to reach is reached and a dc motor is used. As can be seen from this figure, when this is the case, the current signal increases above the programmed safety level, which is sensed by the controller 28 that stops the operation of the motor by cutting off the voltage supplied thereto.

While not illustrated in FIG. 3B, should the encoder 26 detect that the shaft 24 stops moving while current is supplied to the dc motor, the controller 28 cuts off the voltage supplied to the motor for safety reasons. Indeed, as mentioned hereinabove, this condition could be caused by an object, by an external shock to the movable stop or by dirt accumulation in the mechanism preventing rotation of the shaft 24.

Position Holding Mode

In the position holding mode, the controller 28 controls the motor 22 so that shaft rotation is prevented. The encoder 26 supplies data to the controller that may adjust the control of the motor 22 to maintain the shaft in its position. This mode may be used, for example, when a user has positioned the shaft in a selected position, via the direct positioning mode, and requests that this position be maintained.

Figure 4A:
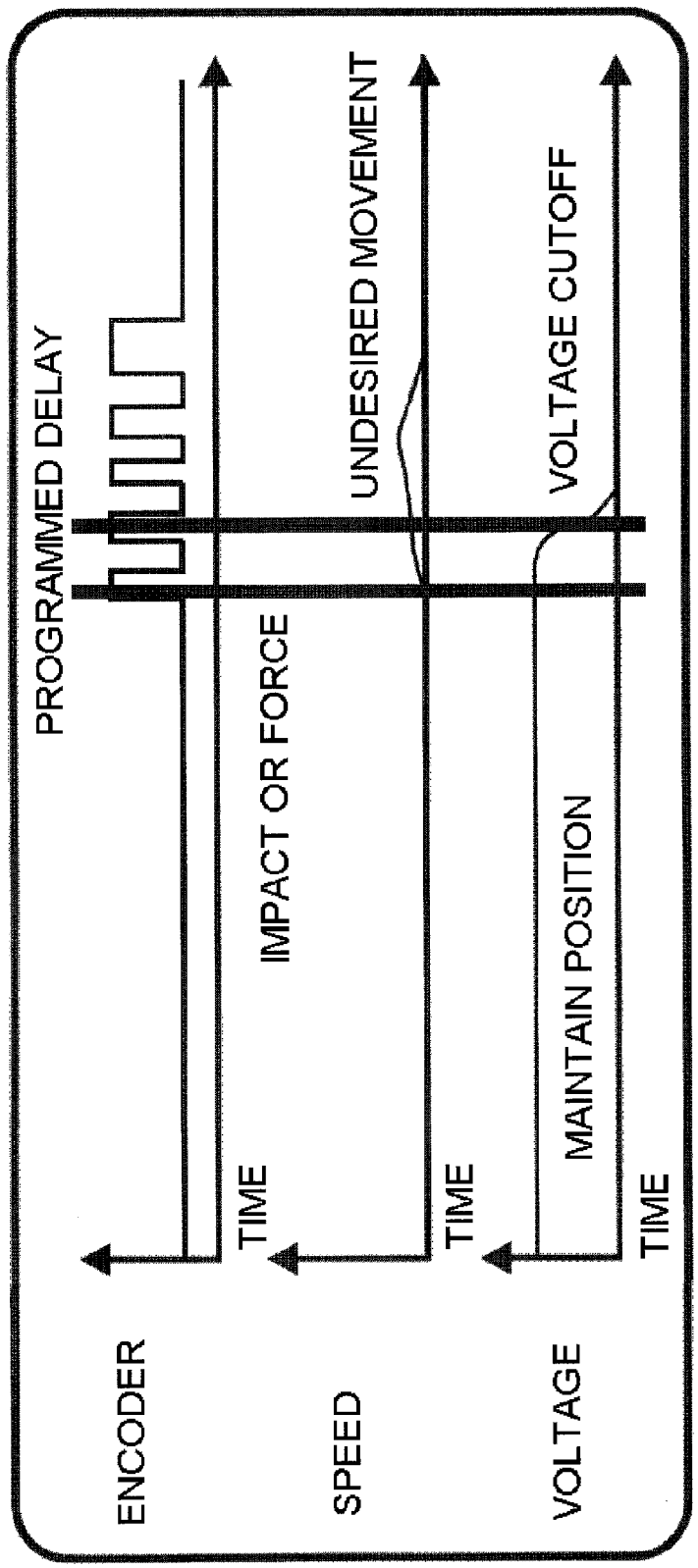
FIGS. 4A and 4B are graphs illustrating the position holding mode for a stepper motor and a dc motor, respectively.

FIG. 4A illustrates the encoder signal, the speed representation and the step frequency signal when a stepper motor is used as the electric motor. To maintain the position of the shaft 24, a predetermined voltage is supplied to the stepper motor in a single step. As a safety feature of the position holding mode, if movement is detected by the encoder, caused, for example by a large force applied to rotate the shaft 24, the corresponding encoder signal is supplied to the controller 28. Should this movement continue for a predetermined programmed delay, the voltage supplied to the stepper motor is cut off and the shaft 24 is free to rotate, for safety purpose. Indeed, in this case the pattern foreseen by the controller 28 is no movement of the shaft 24. When the reality differs from this pattern, i.e. movement of the shaft 24, the safety features of the controller 28 are called and the shaft 24 is free to rotate.

Figure 4B:
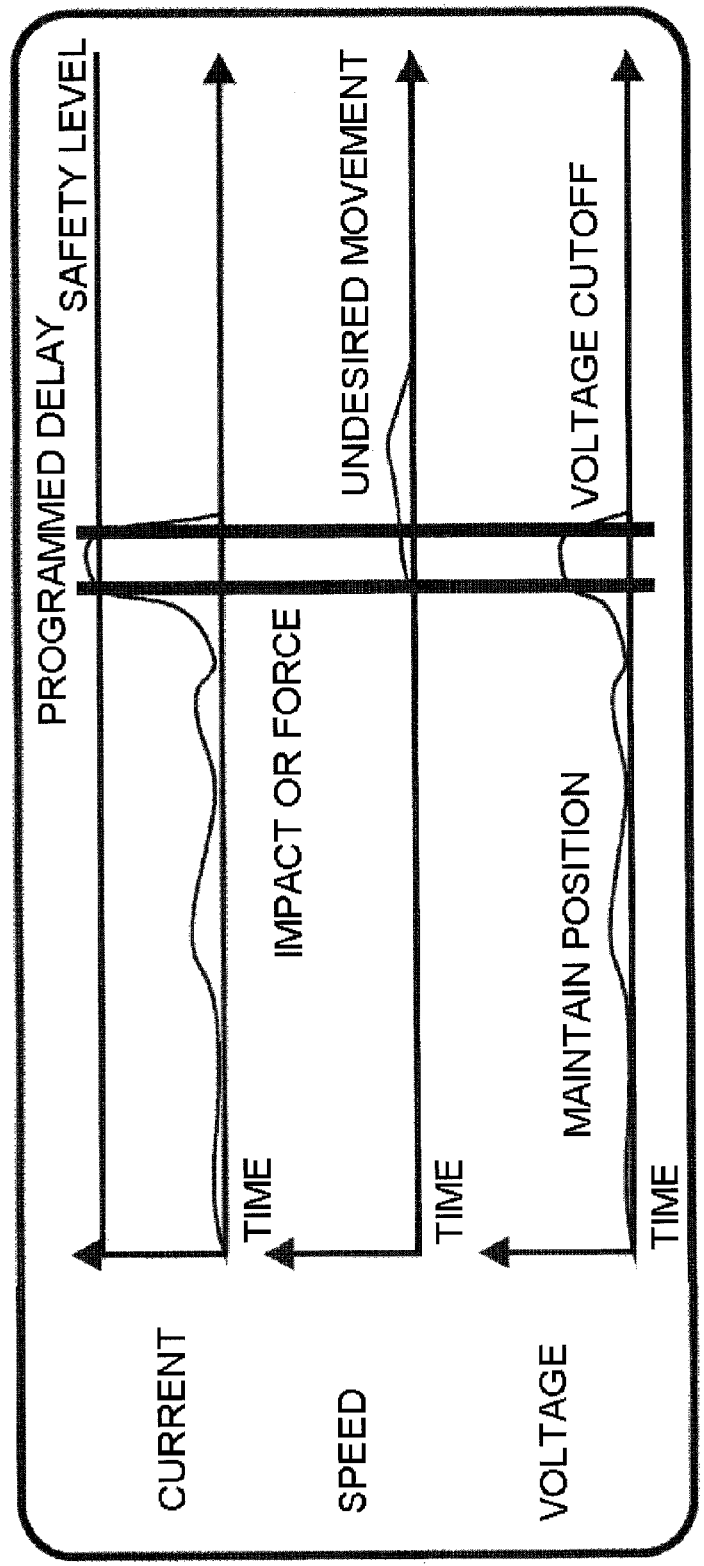

When a dc motor is used as the electric motor, the controller 28 also monitors the amount of current supplied to the motor 22. Again, as a safety feature of the position holding mode, should the amount of current increase above a predetermined safety level, the controller 28 cuts off the voltage supplied to the dc motor. Indeed, the increase in the amount of current supplied could be caused, for example, by an exceedingly large force applied to rotate the shaft 24. This is schematically illustrated in FIG. 4B which illustrates the current signal, the speed representation and the voltage signal when a dc motor is used.

Object Detection Mode

When the controller 28 is in the object detection mode, the controller 28 so controls the motor 22 to rotate the shaft 24 in a desired direction. When an object is encountered, the controller 28 stops the energization of the motor 22 to thereby stop the rotation of the shaft 24. In other words, the shaft 24 is rotated in a desired direction until an external object impedes rotation of the shaft.

When a stepper motor is used as the electric motor, a way used to detect an object is to detect the stop of the rotation of the shaft 24 while the controller 28 supplies movement signals to the stepper motor.

Figure 5A:
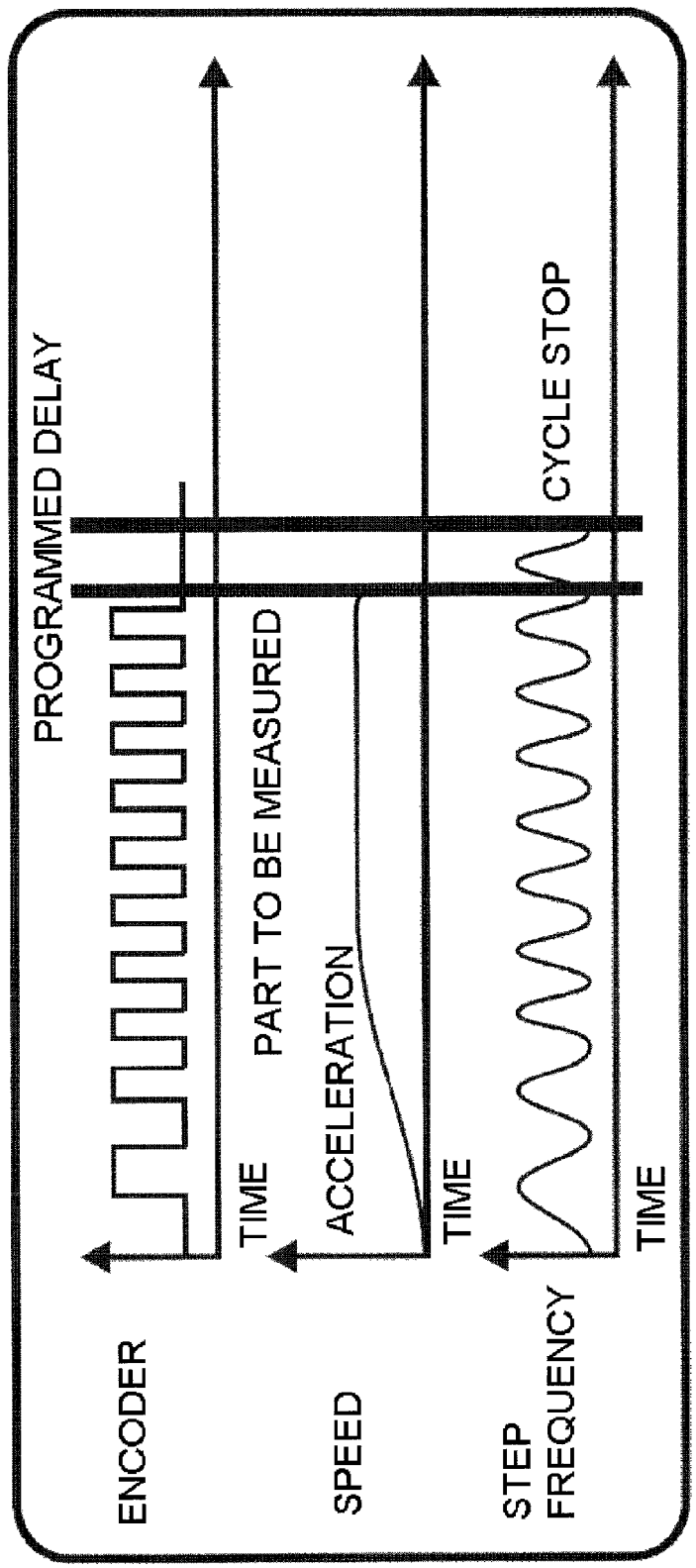
FIGS. 5A and 5B are graphs illustrating the object detection mode for a stepper motor and a dc motor, respectively.

FIG. 5A illustrates the encoder signal, the speed representation and the step frequency signal when a stepper motor is used. The controller 28 determines that an object is reached when the encoder indicates that the shaft does not rotate for a predetermined programmable delay while the controller 28 controls it to do so. When this is the case, the cycle of the motor is stopped. It is to be observed that the nominal speed of the motor when in the object detection mode is less than the nominal speed of the direct positioning mode. This is interesting since it helps prevent damage to the object detected. It is also to be noted that by varying the duty cycle of the voltage supplied to the stepper motor, it is possible to decrease the torque of the motor, thereby also helping the prevention of damage to the object to be detected.

When a dc motor is used as the electric motor, the object detection mode of operation actively uses the monitoring of the current supplied to the dc motor to detect object. Indeed, for dc motors, the current required to rotate the shaft 24 increases when an object is encountered.

Figure 5B:
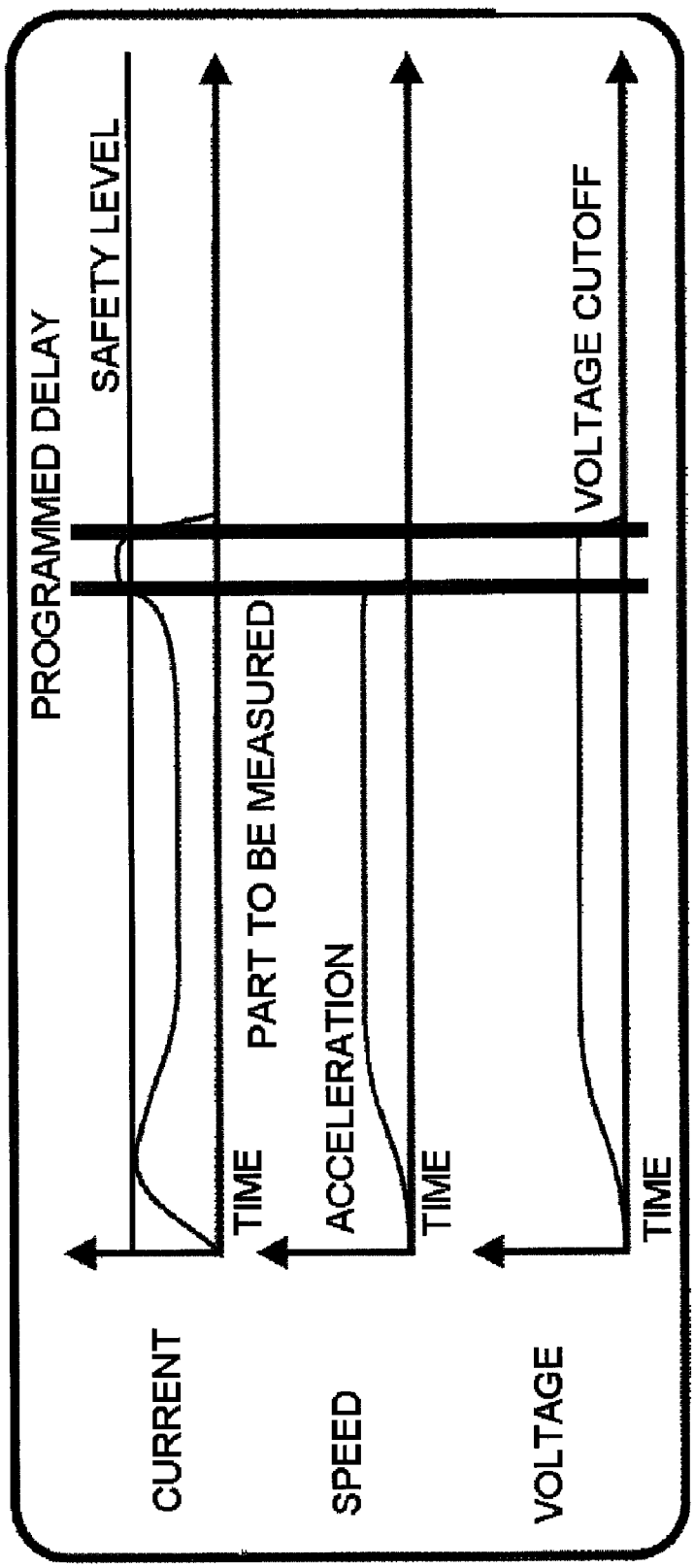

FIG. 5B illustrates the current signal, the speed representation and the voltage signal when a dc motor is used. The controller 28 determines that an object is reached when the current exceeds a predetermined programmable safety level for a predetermined time. When this is the case, the voltage is cut off. It is to be noted that the voltage supplied to the dc motor is lower when in the object detection mode.

It is to be noted that the controller 28 may use both the current increase monitoring and the movement stopping detection to detect an object when a dc motor is used.

It is also to be noted that the movement pattern of the object detection mode is the acceleration of the movable stop up to a predetermined relatively slow speed, the movement in the determined direction at the relatively slow speed and the stop when an object is reached. Should the controller detect that a non-pattern movement occur such as, for example, an acceleration, a deceleration or a movement in an opposite direction, the controller stops the voltage or current to be supplied to the motor.

Movement Assistance Mode

The movement assistance mode is used to start the movement of the shaft 24 in a desired direction by an externally initiated rotation movement of the rotatable shaft in this desired direction directly or indirectly by the user. When in this mode, the controller 28 waits for a movement to be detected by the encoder 26 while no current is supplied to the motor 22. The controller 28 then controls the motor 22 to rotate the shaft 24 in the direction externally initiated by the user.

Figure 6A:
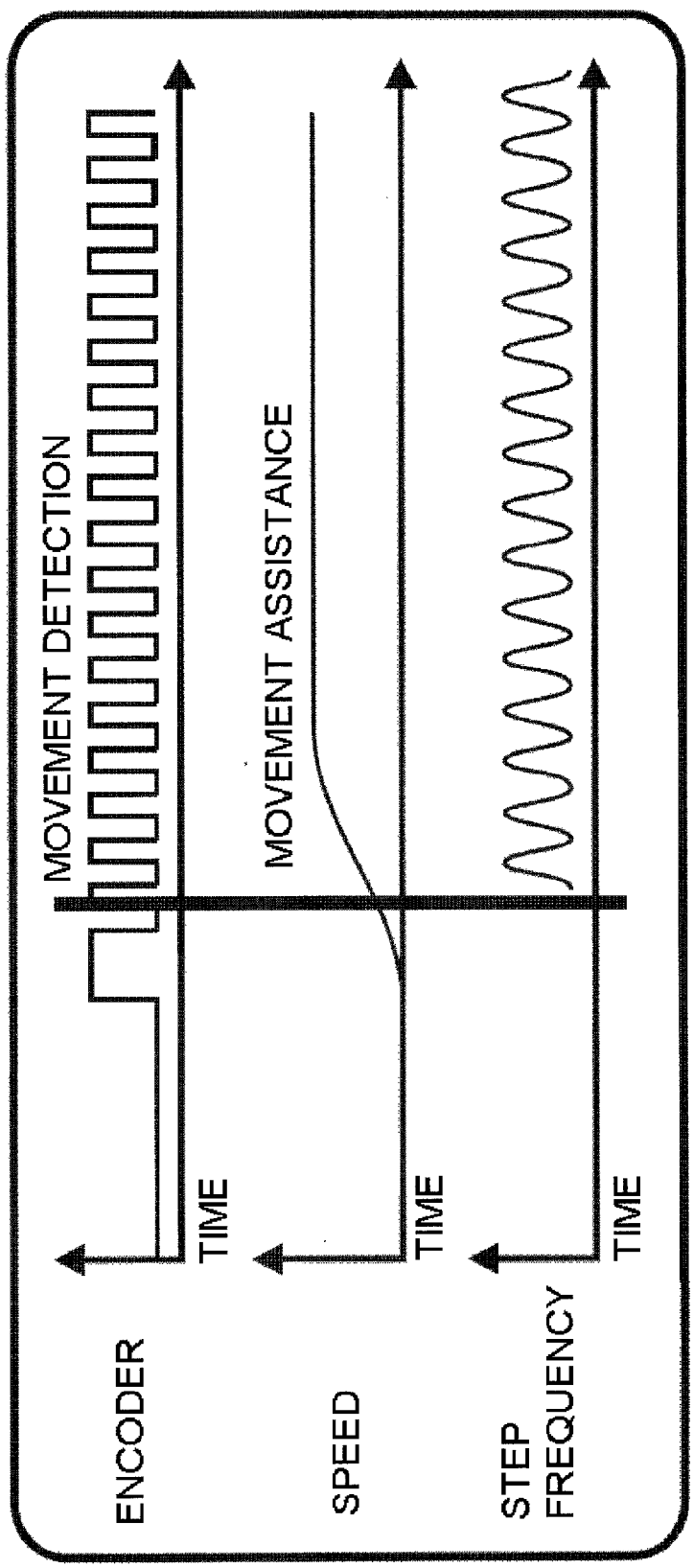
FIGS. 6A and 6B are graphs illustrating the movement assisting mode for a stepper motor and a dc motor, respectively.

FIG. 6A illustrates the encoder signal, the speed representation and the step frequency signal when a stepper motor is used as the electric motor. When the controller 28 receives a movement signal from the encoder 26 indicating movement in the direction desired by the user, it begins to supply the adequate step frequency signal to the motor 22 to continue the movement in the desired direction.

It is to be noted that safety features are also present during the movement assistance mode. Accordingly, should the controller 28 detects that the shaft of the stepper motor deviates from the determined pattern, the step frequency signal is cut off by the controller for safety reasons.

Figure 6B:
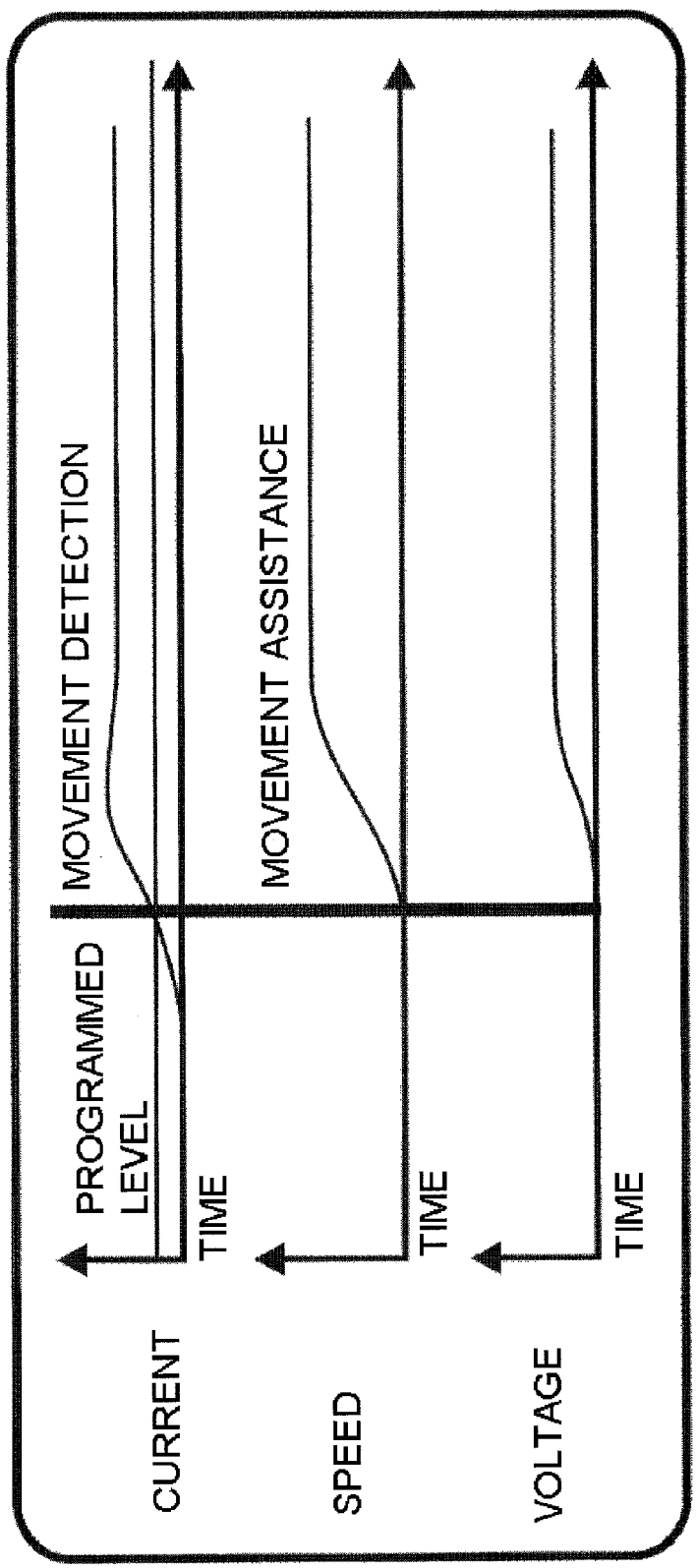

FIG. 6B illustrates the current signal, the speed representation and the voltage signal when a dc motor is used as the electric motor. When the controller 28 detects that a current above a predetermined threshold is supplied to the motor, the controller 28 supplies a voltage signal to continue the movement in the desired direction. Of course, while not illustrated in FIG. 6B, an encoder signal is supplied to the controller when a dc motor is used so the description of FIG. 6A hereinabove also applies to a dc motor.

While the controller 28 controls the rotation of the shaft 24 of the motor in the externally initiated direction, the controller 28 also monitors the amount of current supplied to the dc motor. Again, should the amount of current increase above a predetermined safety level, the controller 28 cuts off the voltage supplied to the dc motor. Indeed, the increase in the amount of current supplied could be caused, for example, by an object preventing rotation of the shaft 24, for example.

Similarly, should the encoder 26 detect that the shaft 24 stops moving while current is supplied to the dc motor, the controller 28 cuts off the voltage supplied to the dc motor for safety reasons. Indeed, this condition could be caused by an object preventing rotation of the shaft 24.

It is to be noted that the movement assistance mode may interestingly be combined with the object detection mode. Indeed, when these two modes are combined, the user may start the movement of the shaft 24 in the desired direction of a known object and the controller 28 controls the motor 22 to rotate the shaft 24 in this direction until the known object is reached.

As will easily be understood by one skilled in the art, all the modes described hereinabove include safety features that stops voltage and/or current to be supplied to the motor should the controller detect, via the encoder signal monitoring and/or the current monitoring that the motor deviates from the expected pattern of the particular mode. It will also be understood that while these patterns have been generally described herein, one skilled in the art could modify these patterns according the particular needs of the application to which the mechanism is applied.

It is believed to be within the abilities of one skilled in the art to configure a controller 28 to achieve the modes described hereinbelow. The specifics of the configuration of the controller 28 will therefore not be described in details herein.

EXAMPLE OF APPLICATION

Motorized Stop for a Miter Saw

Turning now to FIGS. 7 to 19, a motorized stop 100 for a miter saw 102 will be described. The motorized stop 100 uses a position controlled drive mechanism generally as described hereinabove. It is to be noted that the motorized stop 100 described hereinbelow is an illustrative example of an application of the position controlled drive mechanism described hereinabove and should not be used to limit the scope thereof.

FIG. 7 illustrates the motorized stop 100 mounted to the exit table 104 of the miter saw 102. The miter saw 102 is supported by a table 106. It is to be noted that since the miter saw 102, the exit table 104 and the table 106 are not a part of the present invention and since they are believed well known in the art, they will not be further described herein.

The motorized stop 100 includes an extruded longitudinal body 108 to which is mounted a movable stop 110. The movable stop 110 is mounted to a carrier 112, itself slidably mounted to the longitudinal body 108.

FIG. 7 illustrates the movable stop in a first configuration, i.e. mounted to the proximate end of the carrier 112 and in the position closest to the saw blade of the miter saw 102. As can be seen from this figure, the abutting end 114 of the movable stop 110 is very close to the saw 102.

Figure 8:
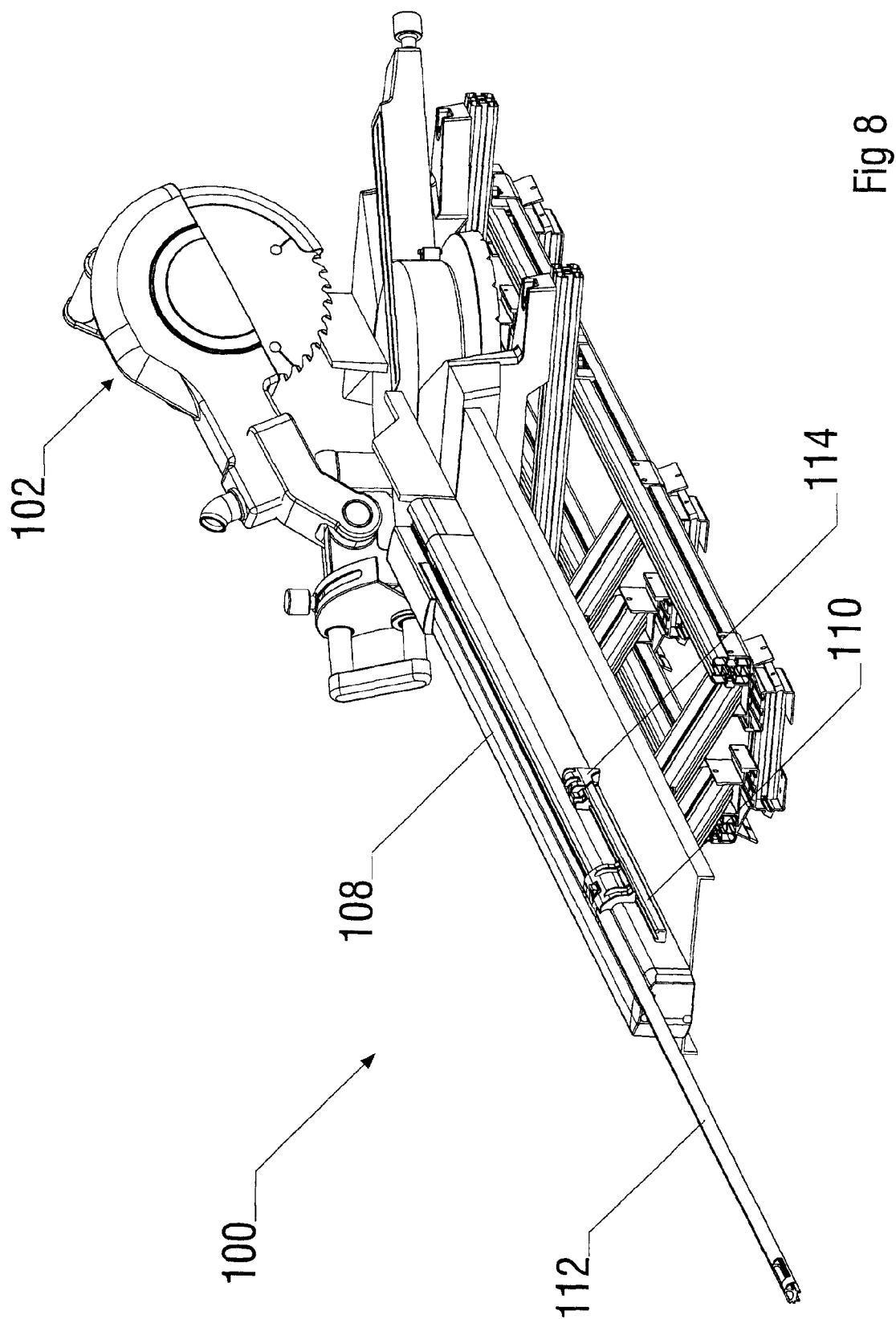
FIG. 8 is a perspective view of the miter saw of FIG. 7 where the motorized stop is shown in the position farthermost from the saw while in the first configuration.

FIG. 8 is very similar to FIG. 7 but illustrates the movable stop 110 in its position farthermost from the miter saw 102 while still in the first configuration. The elements required to move the movable stop from position to position will be described hereinbelow.

Figure 9:
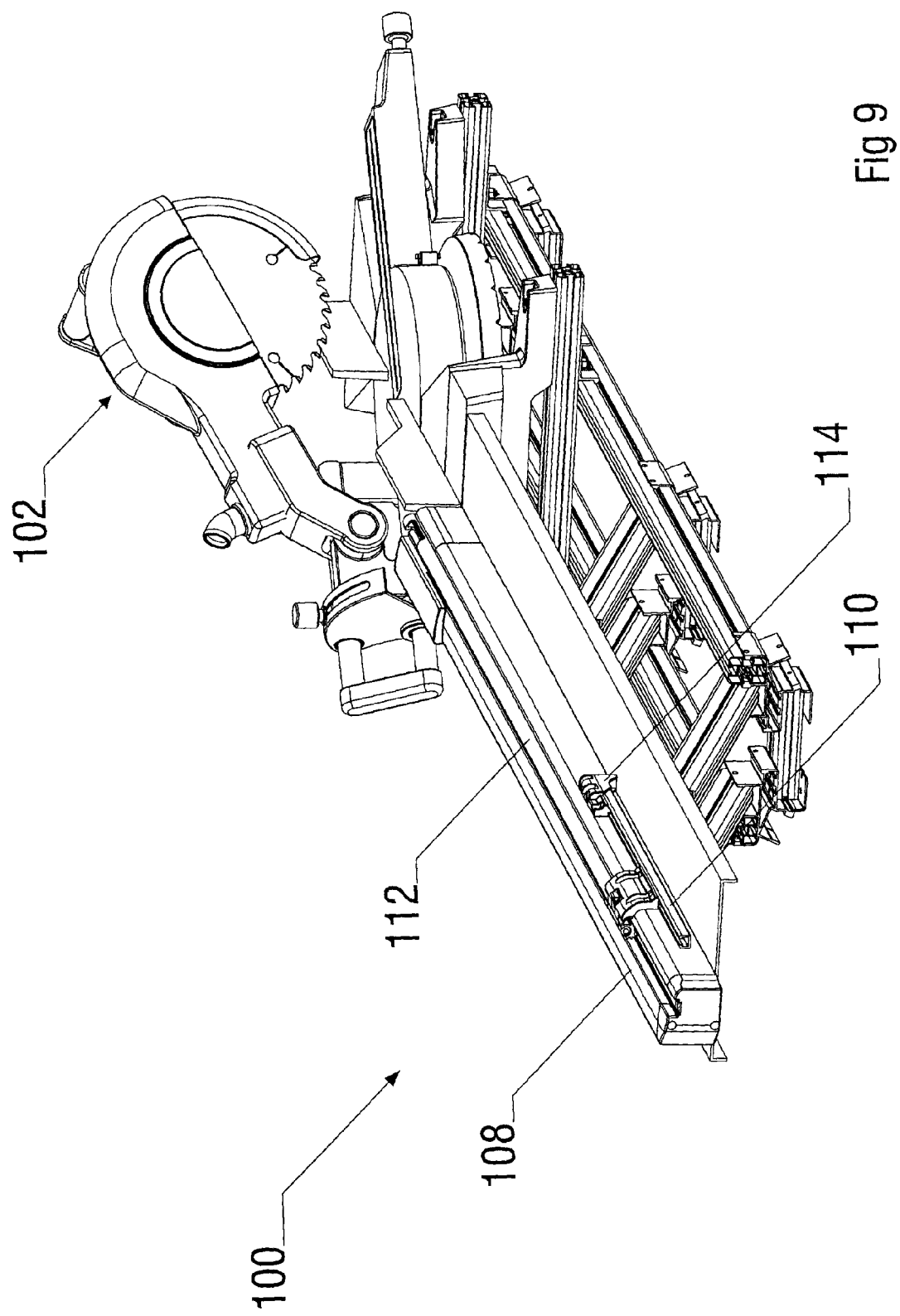
FIG. 9 is a perspective view of the miter saw of FIG. 7 where the motorized stop is shown in the position closest to the saw while in the second configuration.

A second configuration of the movable stop 110 is illustrated in FIG. 9. In this configuration, the movable stop 110 is mounted to the distal end of the carrier 112. FIG. 9 illustrates the movable stop 110 in its position closest to the saw 102 while in the second configuration. It is to be noted that the position of the distal end 114 of the movable stop 110 illustrated in FIG. 9 is generally the same as the position of the of the distal end 114 of the movable stop 110 illustrated in FIG. 8.

Figure 10:
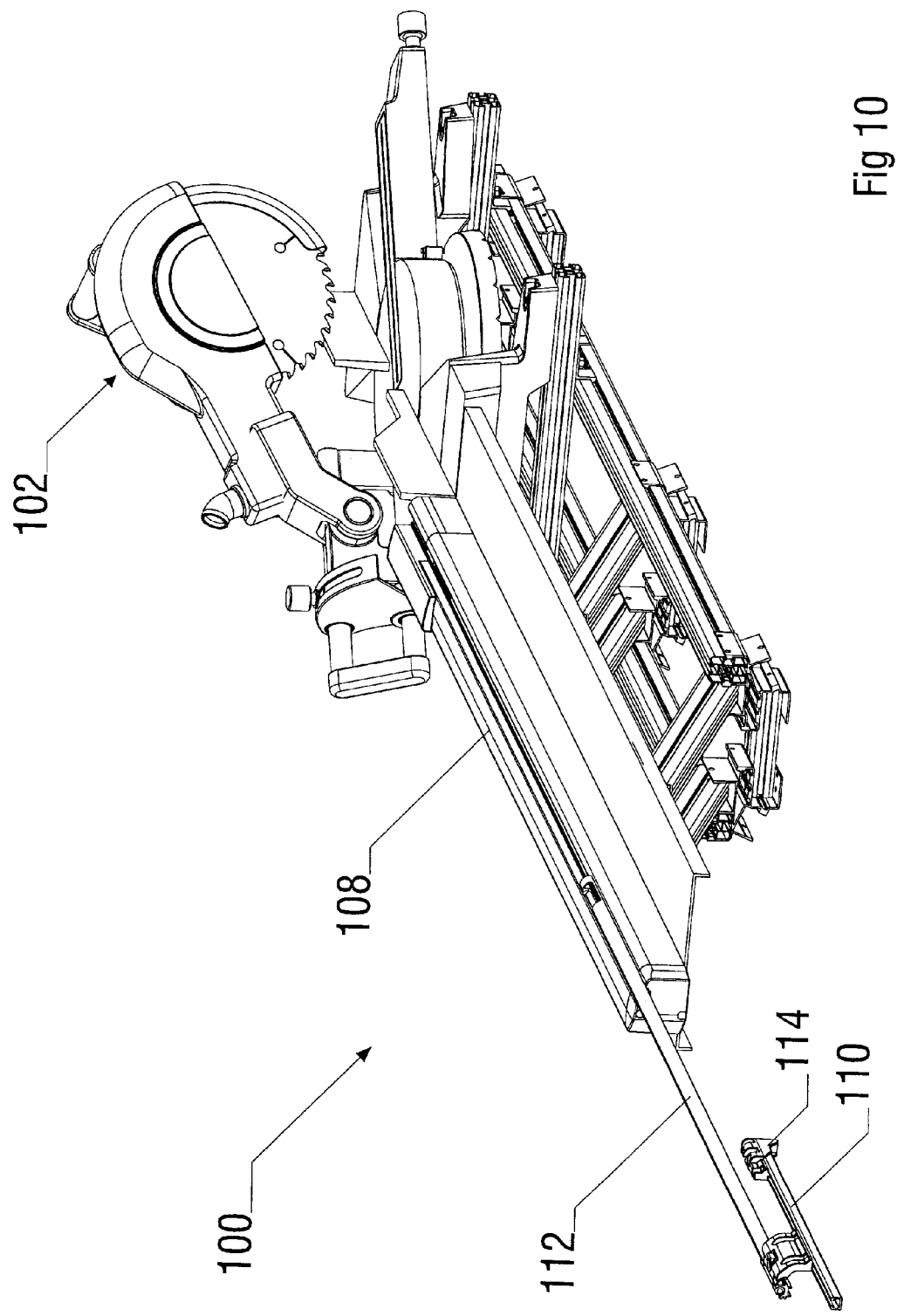
FIG. 10 is a perspective view of the miter saw of FIG. 7 where the motorized stop is shown in the position farthermost from the saw while in the second configuration.
Figure 11:
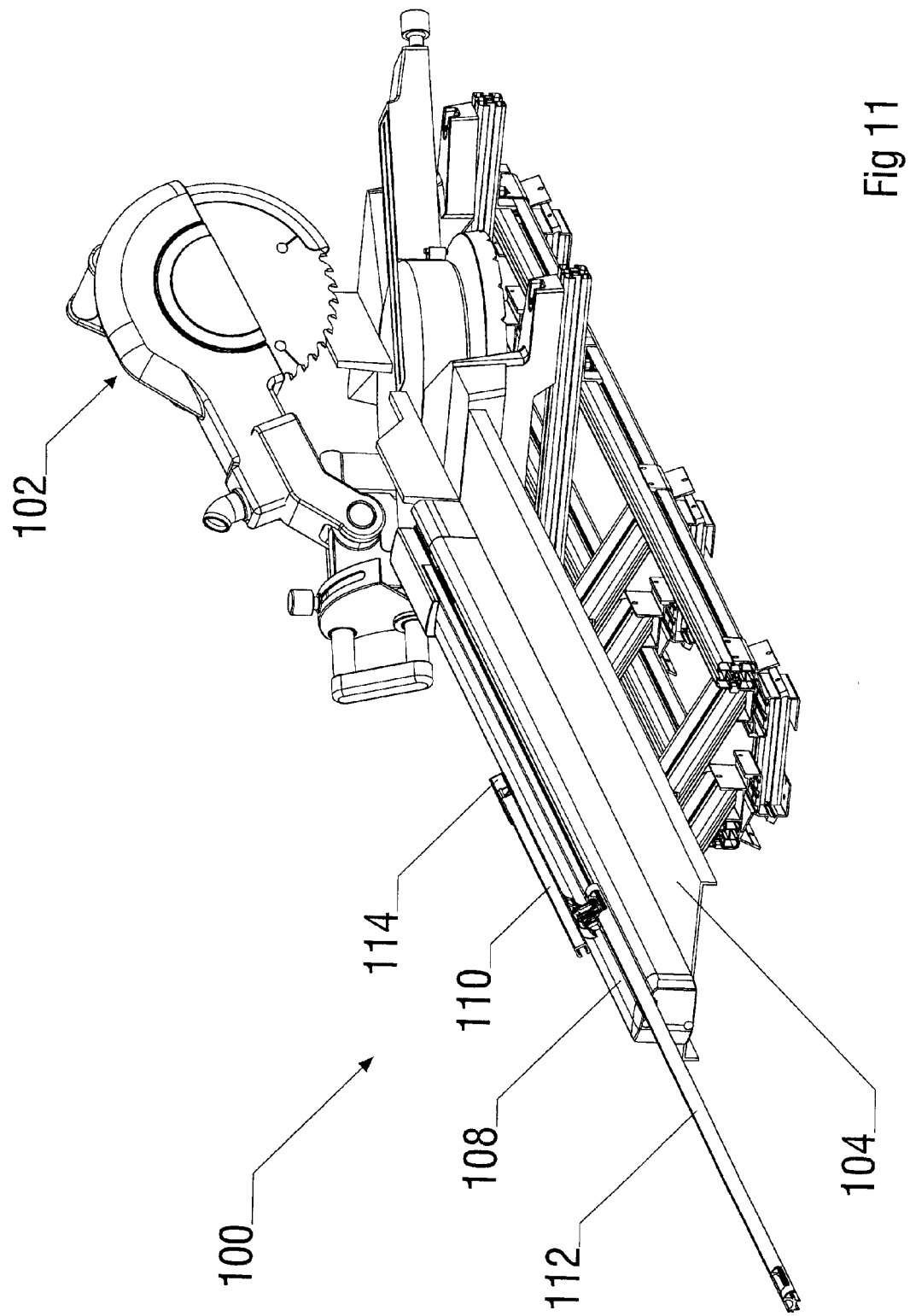
FIG. 11 is a perspective view of the miter saw of FIG. 7 in a position similar to that illustrated in FIG. 8 where the motorized stop is shown in a non-operating position.

FIG. 10 illustrates the movable stop 110 in its position farthermost from the saw 102 while in the second configuration.

One skilled in the art can clearly see that the range of the movable stop 110 has been greatly extended by providing two configuration of the movable stop 110 on the carrier 112.

FIGS. 7 to 10 illustrate the movable stop 110 in an operating position, i.e. that the abutting end 114 thereof is relatively close to the exit table 104 of the saw 102 and that pieces to be cut will be abutted thereby. The movable stop 110 also has a non-operating position illustrated in FIG. 11. When in this non-operating position, the abutting end 114 of the movable stop is far from the exit table 104. When in this non-operating position, the movable stop 110 may be moved from its first configuration to its second configuration, and vice-versa.

Figure 12:
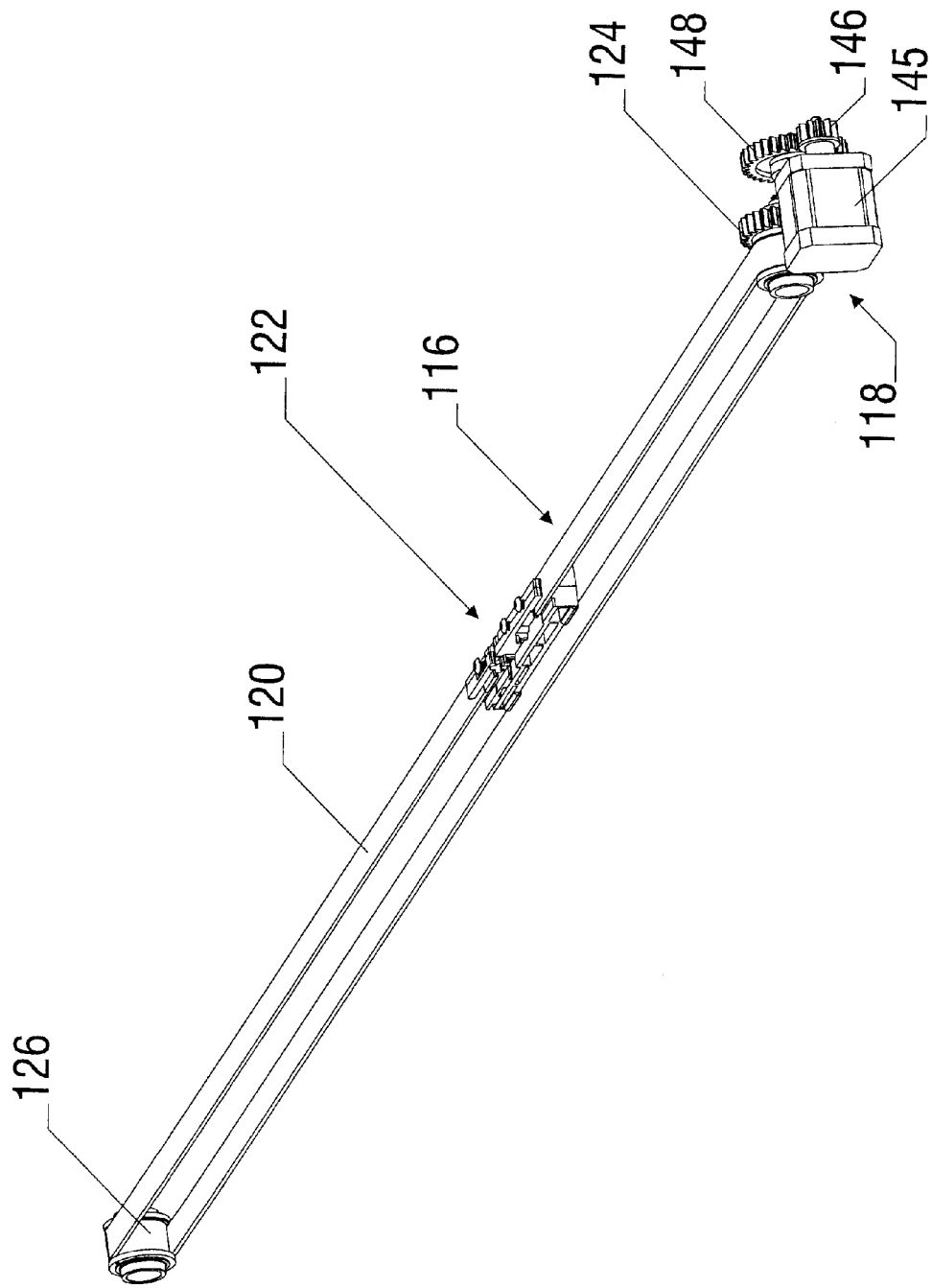
FIG. 12 is a perspective view illustrating the motor assembly and the drive belt assembly of the motorized stop of the saw of FIG. 7.

Turning now to FIG. 12 of the appended drawings, a drive belt assembly 116 and a motor assembly 118 will be described. The assemblies 116 and 118 together define a linear motion generating mechanism as will be described hereinbelow.

The drive belt assembly 116 is generally enclosed in the extruded longitudinal body 108 and includes a cog belt 120, a belt gripping and tensioning member 122, a driving sprocket 124 and a driven sprocket 126. The driving sprocket 124 is associated with the motor assembly 118. The driven sprocket 126 is freewheeling.

Figure 13:
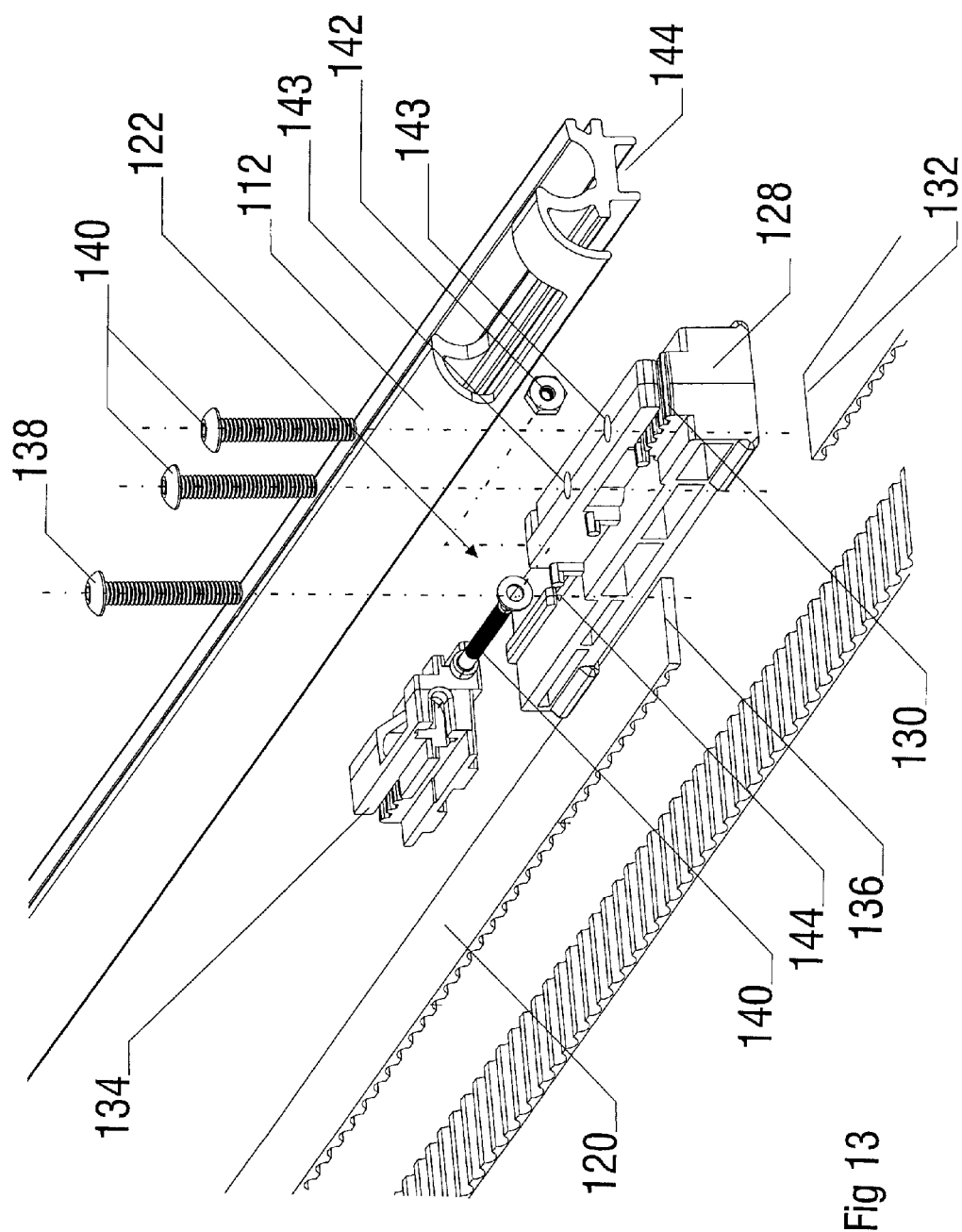
FIG. 13 is an exploded perspective view illustrating the drive belt assembly of FIG. 12 to which a carrier is attached.

FIG. 13 illustrates the belt gripping and tensioning member 122 in an exploded view. The member 122 includes a base 128 provided with a fixed jaw 130 configured and sized to receive and secure a first free end 132 of the cog belt 120. A movable jaw 134, configured and sized to receive and secure a second free end 136 of the cog belt 120 is tensionably mountable to the base 128 via a first fastener 138. The movable jaw 134 is provided with a threaded rod 140 that is inserted in an aperture (not shown) of the base 128 and engaged by a nut 142. Tightening of the nut 142 allows the tightening of the cog belt 120 by pulling on the movable jaw 134.

FIG. 13 also illustrates the assembly of the carrier 112 to the belt gripping and tensioning member 122. As can be seen from this figure, the carrier 112, which is advantageously an extruded member, includes a channel 144 so configured and sized as to fit onto a ridge 146 of the base 128. Two fasteners 140 are used to mount the carrier 112 onto the base 128 via the threaded apertures 143. It is also to be noted that the first fastener 138 also goes through the carrier 112 and the movable jaw 134 before being mounted to the threaded aperture 144 of the base 128.

Returning to FIG. 12, the motor assembly 118 includes an electric motor 145, a sprocket 146 mounted to the rotating shaft of the electric motor 146 and a speed reducing sprocket 148 mounted to both the sprocket 146 and to the driving sprocket 124 of the drive belt assembly 116.

Figure 14:
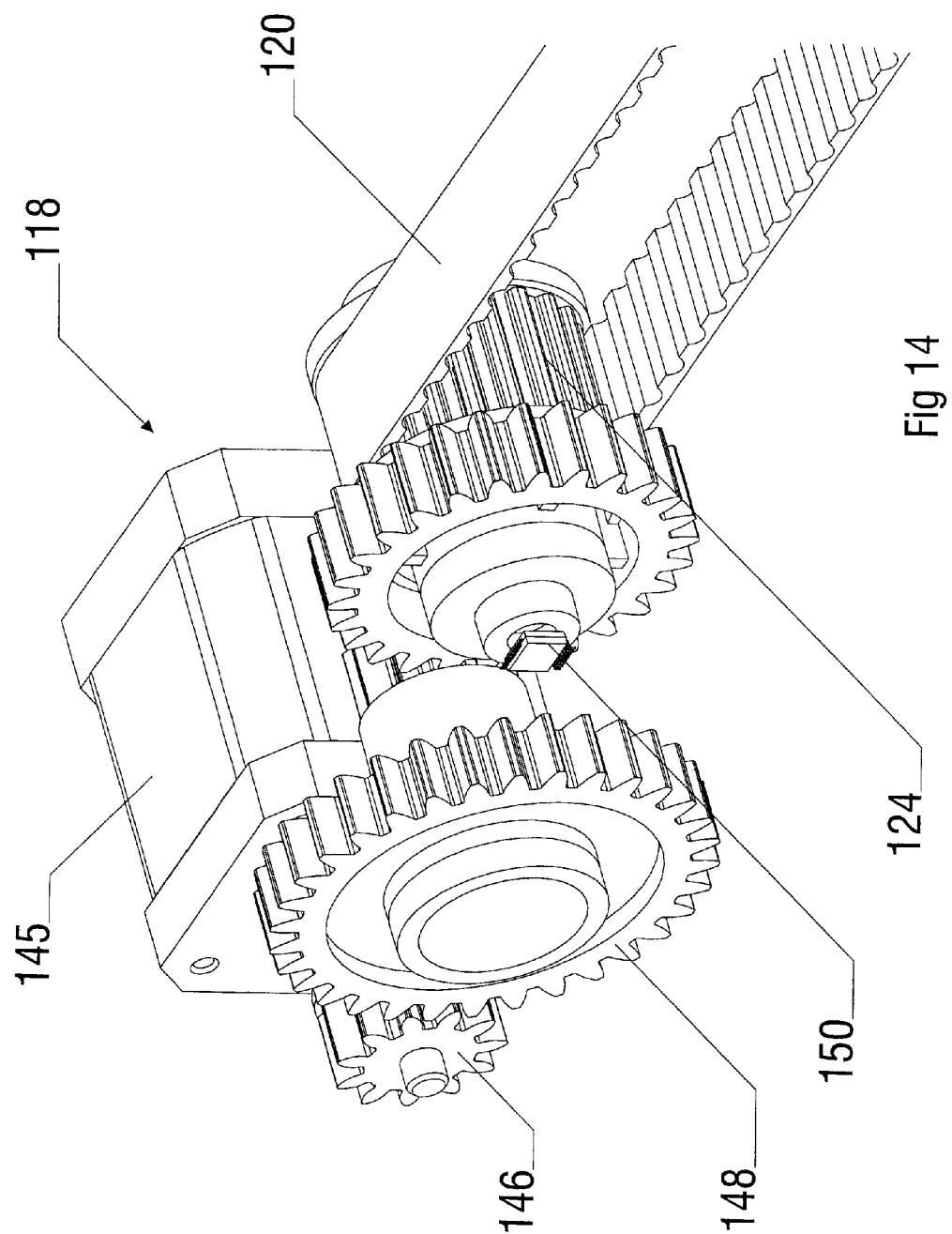
FIG. 14 is a perspective view of the motor assembly.

As can be better seen from FIG. 14 of the appended drawings, the motor assembly 118 also includes an encoder 150 associated with the driving sprocket 124 to detect rotation thereof. Of the many technologies available for the encoder mentioned hereinabove, the magnetic rotary encoding technology has been selected. It is to be noted that for clarity purpose, the encoder 150 is represented on FIG. 14 as an electronic chip. Of course, one skilled in the art will understand that a circuit board (see FIG. 19) would be advantageous to mount the electronic circuit chip in proximity of the driving sprocket 124.

Figure 15:
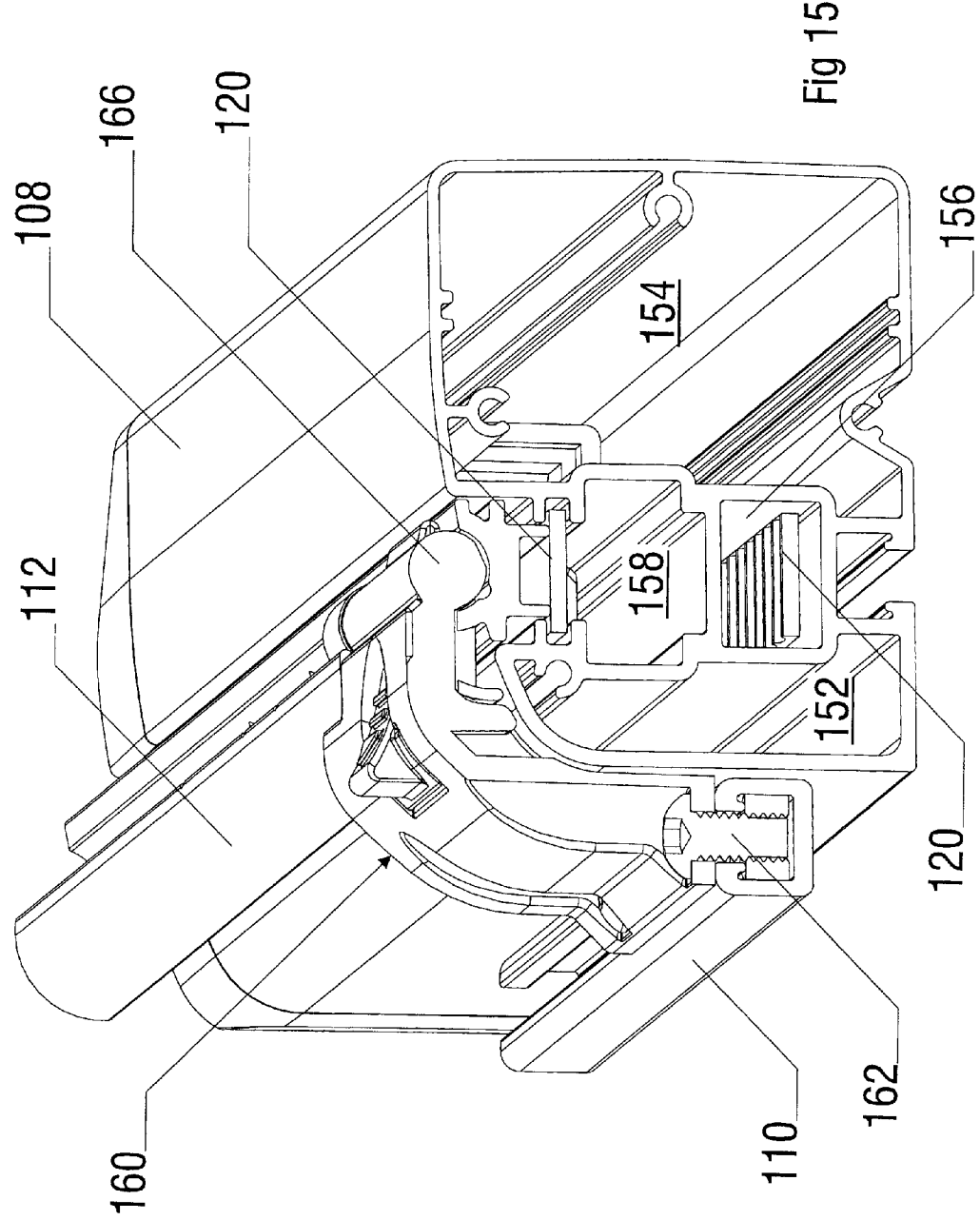
FIG. 15 is a perspective view of the extruded body enclosing the drive belt assembly.
Figure 16:
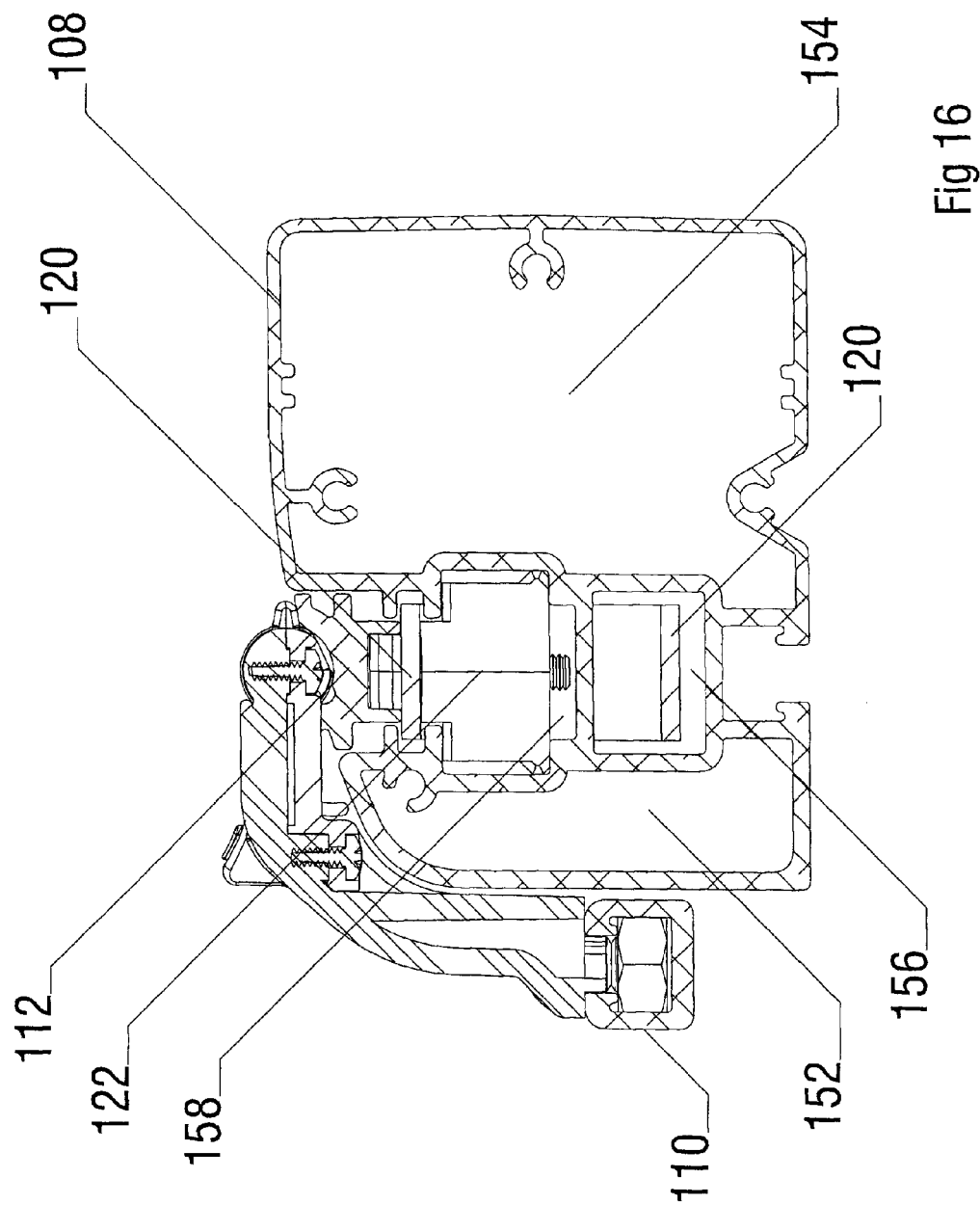
FIG. 16 is a sectional plan view of the extruded body of FIG. 15.

FIGS. 15 and 16 of the appended drawings respectively illustrate a sectional perspective view and a sectional plan view of the extruded longitudinal body 108 to which is attached the carrier 112.

The extruded longitudinal body 108 includes first and second structural chambers 152 and 154 and a cog belt chamber 156. A channel 158 is configured and sized to receive the gripping and tensioning member 122 and part of the cog belt 120.

The gripping and tensioning member 122 may thus slide in the channel 158 upon rotation of the driving sprocket 124 under the action of the electric motor 145. Since the carrier 112 is directly mounted to the member 122, sliding movements of the member 122 cause sliding movement of the carrier 112 and thus of the movable stop 110.

Figure 17:
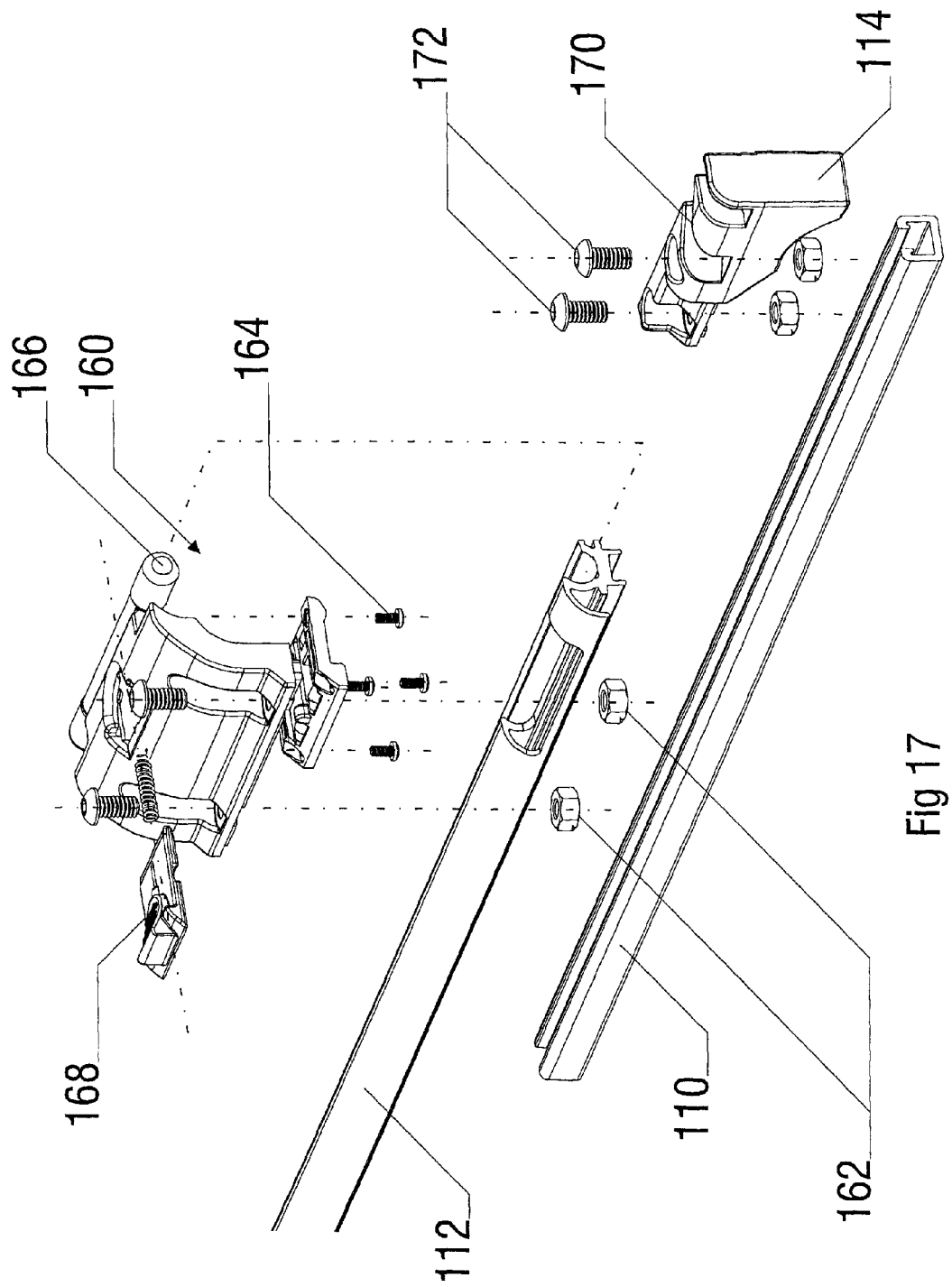
FIG. 17 is an exploded perspective view of the movable stop.

Indeed, as can be better seen from FIG. 17, the movable stop 110 is pivotally mounted to the carrier 112 via a hinged bracket 160. More specifically, the stop 110 is a generally U-shaped extrusion that may be adjustably mounted to the bracket 160 via two fasteners 162. The bracket itself is mounted to the carrier 112 via four fasteners 164 and includes a pivot 166 that allows the stop 110 to reciprocately move between an operating position shown, for example in FIG. 7 and a non-operating position shown in FIG. 11. A lock assembly 168 allows the bracket to be locked in either of the operating and non-operating positions.

The abutting end 114 of the movable stop 110 is part of an adjustable end element 170 that may be mounted to the movable stop 110 via two fasteners 172.

Figure 18:
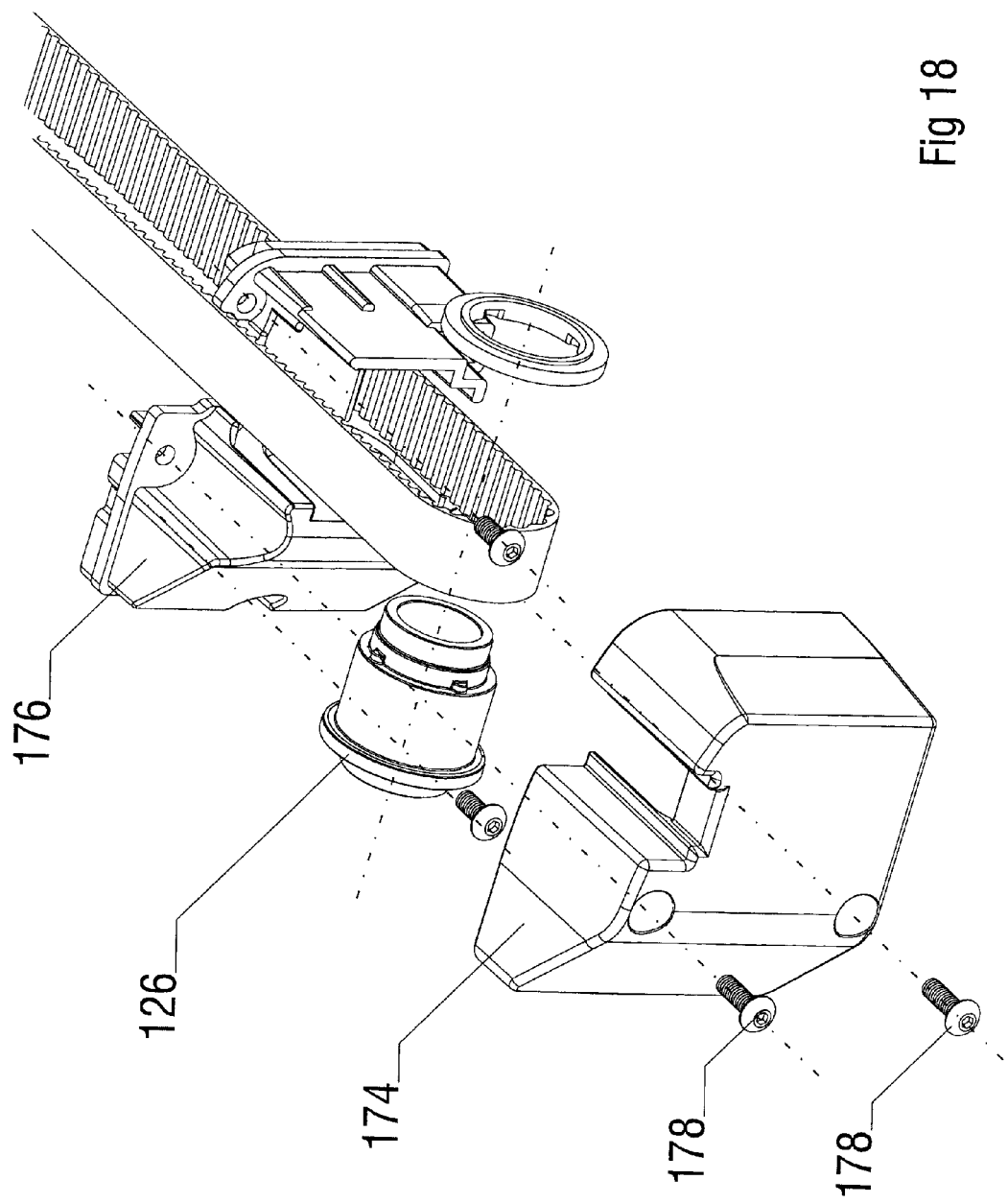
FIG. 18 is an exploded perspective view of the distal end of the drive belt assembly.

Turning now briefly to FIG. 18, the freewheeling driven sprocket 126 is mounted to the distal end of the longitudinal extruded body 108 via a two piece housing 174, 176 held together and to the extruded body 108 by fasteners 178.

Figure 19:
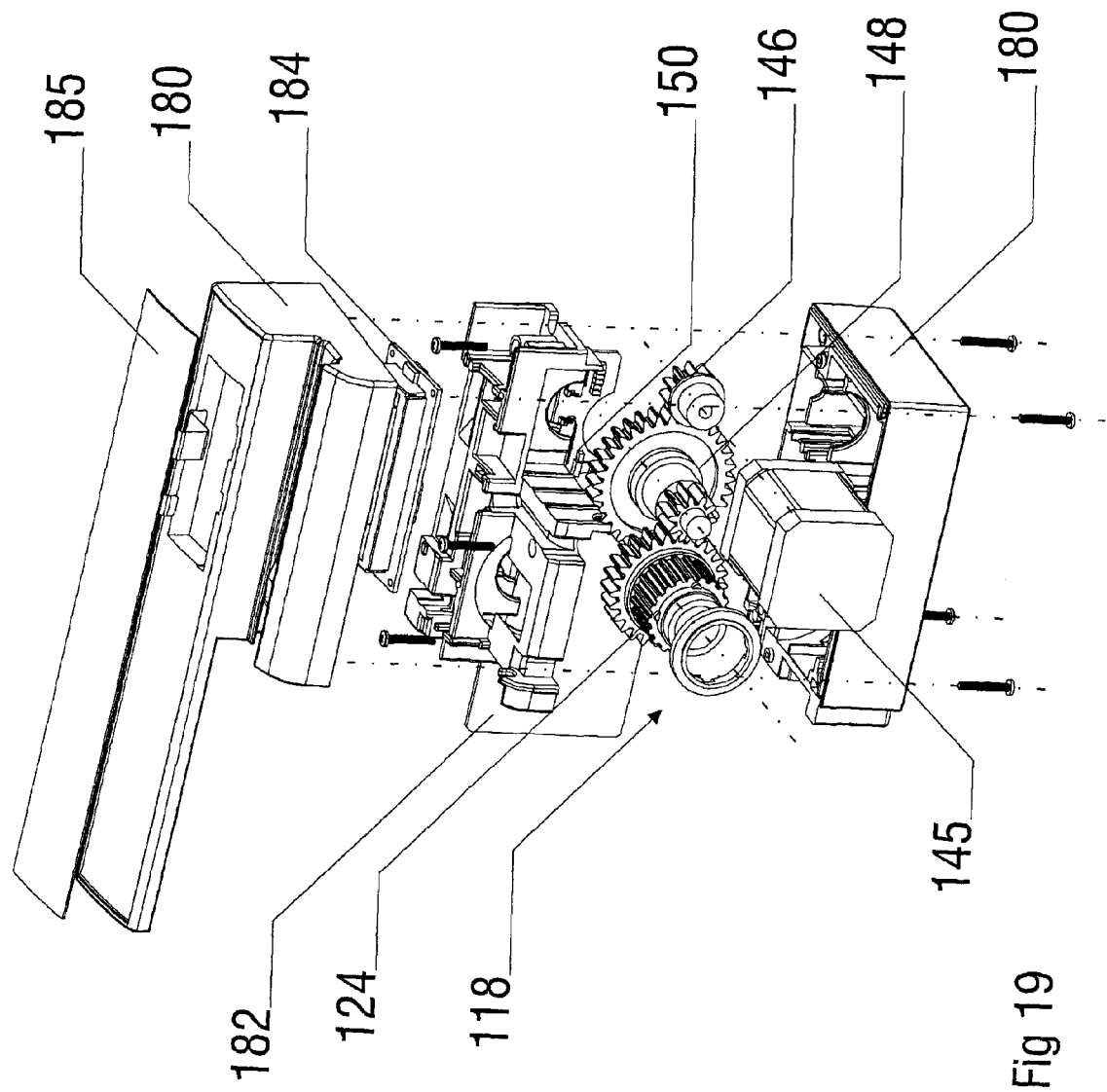
FIG. 19 is an exploded perspective view of the motor assembly and its housing.

Finally, FIG. 19 illustrates the housing 180 that encloses the motor assembly 118, the controller 182 provided with a display 184 and an input device 185. The encoder 150 is mounted to the controller 182. The configuration and size of the housing 180 is such that it may be mounted to the proximate end of the extruded longitudinal body 108.

It is to be noted that since the motor 145 is a stepper motor, the controller 182 does not have the current sensing features that would be present should a dc motor be used.

The controller 182 is so configured to provide the four modes of operation described hereinabove while enabling the safety features described.

When in the direct positioning mode, the controller 182 waits for a selected length to be input by the user via the input device 185. When such a length is entered, the controller 182 controls the motor 145 to rotate the sprocket 146 in the required direction until the abutting end 114 of the movable stop 110 is at a distance from a reference point, i.e. the blade of the saw 102, equal to the input length. Indeed, since the encoder 150 knows the angular position of the driving sprocket 124 and since the controller 182 knows the characteristics of the sprocket 124 and the position of the reference point, the controller 182 may calculate the longitudinal position of the end 114 of the movable stop 110 at any time and stop the movement thereof when the selected position is reached.

It is to be noted that during movement of the movable stop 110, the controller continuously monitors the angular data supplied by the encoder 150 to safely cut off the supply of the motor 145 should an undesired stop or movement of the movable stop 110 occur.

It is also to be noted that should the length entered require that the user change the mounting position of the movable stop 110 from the proximate end of the carrier 112 to the distal end thereof, and vice-versa, the controller 182 would instruct the user to do so.

When in the position holding mode, for example when a selected position is reached, the controller 182 monitors the encoder 150 and controls the motor 145 to prevent movement of the movable stop 110.

Typically, the object detection mode is used when the user desires to know the length of a piece that is placed on the exit table 104 of the saw 102. The controller 182 instructs the movable stop 110 to move towards the saw 102 and to stop when the encoder 150 detects the piece, as described hereinabove. The position of the stop 110, and therefore the length of the piece, may then be displayed on the display 185.

The movement assistance mode is used for example to start the object detection mode described hereinabove. It may also be used to start the movement that positions the movable stop 110 in its position farthermost from the saw blade, for example when the movable stop 110 is not required.

It is to be noted that the controller has non-volatile memory that stores the position of the motorized stop 100 and/or the reference point when the power is shut off. Of course, the controller is also configured to allow the user to reset the position of the motorized stop and/or of the reference point for calibration purposes. For example, at each power on of the motorized stop, the controller moves the movable stop to an end in the detection mode then resets the reference point.

It is to be noted that many modifications could be done to the motorized stop 100. As non-limiting examples, the drive belt assembly could be replaced by a rack and pinion assembly, a ball screw assembly, the number and/or configuration of the various sprockets could be different.

It will easily be understood by one skilled in the art that the programmed delays, and current safety levels illustrated in FIGS. 2A to 6B are highly dependent on the technology for the different elements of the drive mechanism used and on other factors. It is believed that their determination should be within the skills of those skilled in the art.

It is to be noted that part of the above description is concerned with relatively small electric dc motors that are directly supplied with electric current by the controller of the drive mechanism. However, should large electric dc motors be required for particular applications, it could be advantageous to supply them directly from a power source (not shown) other than the controller and to use a separate current sensor to detect the amount of current supplied to the dc motor and to supply this current data to the controller.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention as defined in the appended claims.

What is claimed is:

1. A position controlled drive mechanism comprising:
an electric motor provided with a rotatable shaft;
a movable stop operably connected to the rotatable shaft;
a sensor for generating a displacement signal indicative of a displacement of the movable stop; and
a controller so connected to the electric motor that rotation of the rotatable shaft is controlled thereby, the controller being so connected to the sensor to receive the displacement signal and to calculate therefrom a position of the movable stop;
the controller including at least two of the following modes of operation in which the controller is so configured as to:
   a) control the electric motor to rotate the rotatable shaft to reach a selected position of the movable stop;
   b) control supply of voltage or of current to the electric motor to maintain a current position of the movable stop, wherein the supply of voltage or current is cut if a large force applied to rotate the shaft prevents maintaining the current position;
   c) control the electric motor to rotate the rotatable shaft in a selected direction until an external object hinders the rotation of the rotatable shaft; and
   d) control the electric motor to assist an externally initiated rotation movement of the rotatable shaft detected by the sensor.

2. The position controlled drive mechanism recited in claim 1, wherein the rotatable shaft of the electric motor is associated with a motion generating mechanism.

3. The position controlled drive mechanism recited in claim 2, wherein the motion generating mechanism is a linear motion generating mechanism.

4. The position controlled drive mechanism recited in claim 3, wherein the linear motion generating mechanism includes at least one sprocket associated with the rotatable shaft.

5. The position controlled drive mechanism recited in claim 4, wherein the linear motion generating mechanism includes a rack associated with the sprocket.

6. The position controlled drive mechanism recited in claim 4, wherein the linear motion generating mechanism includes a cog belt associated with the sprocket and a free-wheeling sprocket associated with the cog belt.

7. The position controlled drive mechanism recited in claim 6, wherein the movable stop is fixedly mounted to the cog belt for reciprocal longitudinal movements along an axis generally parallel to the cog belt.

8. The position controlled drive mechanism recited in claim 7, wherein the controller is so configured as to determine the linear position of the movable stop with respect to a reference point.

9. The position controlled drive mechanism recited in claim 8, wherein the controller further includes a display to display the linear position of the movable stop.

10. The position controlled drive mechanism recited in claim 1, wherein the electric motor is selected from the group consisting of a servo motor, a dc motor and a dc brushless motor.

11. The position controlled drive mechanism recited in claim 10, wherein the controller is so configured as to sense the current supplied to the electric motor.

12. The position controlled drive mechanism recited in claim 11, wherein the controller is so configured as to detect a hindrance from an external object by detecting an increase of the current supplied above a safety level.

13. The position controlled drive mechanism recited in claim 10, wherein the controller is further so configured as to continuously monitor the electric current supplied to the electric motor and to stop the rotation of the rotatable shaft should the electric current supplied to the electric motor increase above a safety limit.

14. The position controlled drive mechanism recited in claim 1, wherein the controller continuously monitors the displacement signal to calculate a continuously updated position of the movable stop.

15. The position controlled drive mechanism recited in claim 1, wherein:
the displacement signal comprises shaft angular position data;
the sensor comprises an encoder associated with the rotatable shaft as to generate the shaft angular position data; and
the controller calculates the position of the movable stop based on the shaft angular position data.

16. The position controlled drive mechanism recited in claim 15, wherein the electric motor is a stepper motor.

17. The position controlled drive mechanism recited in claim 16, wherein the controller is so configured to detect a hindrance from an external object by detecting the stop of the rotatable shaft by an analysis of the shaft angular position data received from the encoder.

18. The position controlled drive mechanism recited in claim 16, wherein the controller is further so configured as to continuously monitor the angular position data and to stop the rotation of the rotatable shaft should an uncontrolled movement of the rotatable shaft occur.

19. The position controlled drive mechanism recited in claim 15, wherein the encoder is a rotary encoder.

20. The position controlled drive mechanism recited in claim 19, wherein the rotary encoder is selected from the group consisting of Hall effect sensors, magnetic encoders, optical encoders and mechanical encoders.

21. The position controlled drive mechanism recited in claim 1, wherein control of the electric motor to rotate the rotatable shaft to reach a selected position of the movable stop comprises controlling acceleration and deceleration of the electric motor.

22. A control method for the position of a drive mechanism comprising, in no particular order:
providing an electric motor provided with a rotatable shaft;
providing a sensor for generating a displacement signal indicative of a displacement of a movable stop operably connected to the rotatable shaft;
providing a controller so connected to the electric motor as to control the rotation of the rotatable shaft therewith;
transferring the displacement signal to the controller;
configuring the controller to calculate a position of the movable stop based on the displacement signal and to alternatively perform at least two of the following modes of operation:
 a) controlling the electric motor to rotate the rotatable shaft to reach a selected position of the movable stop;
 b) controlling supply of voltage or of current to the electric motor to maintain a current position of the movable stop, wherein the supply of voltage or current is cut if a large force applied to rotate the shaft prevents maintaining the current position;
 c) controlling the electric motor to rotate the rotatable shaft in a selected direction until an external object hinders the rotation of the rotatable shaft; and
 d) controlling the electric motor so as to assist an externally initiated rotation movement of the rotatable shaft detected by the sensor.

* * * * *